(12) United States Patent
Koga et al.

(10) Patent No.: US 8,745,448 B2
(45) Date of Patent: Jun. 3, 2014

(54) STORAGE SYSTEM, STORAGE CONTROL APPARATUS AND METHOD FOR FAILURE RECOVERY

(75) Inventors: Tsutomu Koga, Matsuda (JP); Koji Washiya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/520,476

(22) PCT Filed: Jun. 6, 2012

(86) PCT No.: PCT/JP2012/003696
§ 371 (c)(1),
(2), (4) Date: Jul. 3, 2012

(87) PCT Pub. No.: WO2013/183084
PCT Pub. Date: Dec. 12, 2013

(65) Prior Publication Data
US 2013/0332768 A1    Dec. 12, 2013

(51) Int. Cl.
*G06F 11/00* (2006.01)
(52) U.S. Cl.
USPC .................. 714/43; 714/4.1; 714/42
(58) Field of Classification Search
None
See application file for complete search history.

(56) References Cited

U.S. PATENT DOCUMENTS

| | | | |
|---|---|---|---|
| 7,738,366 B2 * | 6/2010 | Uddenberg et al. | 370/229 |
| 7,849,248 B2 * | 12/2010 | Johnson et al. | 710/300 |
| 8,077,605 B2 * | 12/2011 | McCarty et al. | 370/225 |
| 8,095,820 B2 * | 1/2012 | Douchi et al. | 714/6.13 |
| 8,244,948 B2 * | 8/2012 | Johnson et al. | 710/300 |
| 8,312,325 B2 * | 11/2012 | Suzuki et al. | 714/42 |
| 8,321,596 B2 * | 11/2012 | Johnson et al. | 710/2 |
| 8,443,237 B2 * | 5/2013 | Konishi et al. | 714/43 |
| 2006/0047908 A1 | 3/2006 | Chikusa et al. | |
| 2007/0070885 A1 * | 3/2007 | Uddenberg et al. | 370/225 |
| 2009/0007154 A1 * | 1/2009 | Jones | 719/326 |
| 2009/0063901 A1 | 3/2009 | Suzuki et al. | |
| 2009/0222623 A1 | 9/2009 | Nakamura et al. | |
| 2009/0265584 A1 * | 10/2009 | Kawakami et al. | 714/43 |
| 2010/0064086 A1 * | 3/2010 | McCarty et al. | 710/300 |
| 2011/0283150 A1 * | 11/2011 | Konishi et al. | 714/42 |
| 2011/0320886 A1 * | 12/2011 | Suzuki et al. | 714/48 |

FOREIGN PATENT DOCUMENTS

| | | |
|---|---|---|
| EP | 2096530 A2 | 9/2009 |
| EP | 2163996 A1 | 3/2010 |
| JP | 2009-211140 A | 9/2009 |

* cited by examiner

Primary Examiner — Christopher McCarthy
(74) Attorney, Agent, or Firm — Volpe And Koenig, P.C.

(57) ABSTRACT

A storage system comprises a storage device for storing data, a control apparatus which controls the storage device and comprises multiple communication ports, and a switch apparatus which expands the number of storage device couplings and comprises multiple communication ports. Respective multiple communication ports of the control apparatus are coupled to respective multiple communication ports of the switch apparatus, and the switch apparatus is coupled to the storage device. The control apparatus configures at least one communication port of the multiple communication ports of the control apparatus, to a dedicated communication port for outputting only a prescribed command issued when a failure is detected.

12 Claims, 24 Drawing Sheets

Fig. 6

Primary CTLRT — 52

| Device SAS address 210 | SAS port number 211 |
|---|---|
| 1000 | 0 |
| 2000 | 0 |
| 2001 | 0 |
| 2002 | 0 |
| 2003 | 0 |
| 1001 | 0 |
| 2010 | 0 |
| 2011 | 0 |
| 2012 | 0 |
| 2013 | 0 |
| .. | .. |

52b

Secondary CTLRT — 52

| Device SAS address 210 | SAS port number 211 |
|---|---|
| 1100 | 0 |
| 2000 | 0 |
| 2001 | 0 |
| 2002 | 0 |
| 2003 | 0 |
| 1101 | 0 |
| 2010 | 0 |
| 2011 | 0 |
| 2012 | 0 |
| 2013 | 0 |
| .. | .. |

Fig. 7

Primary EXPRT (EXP #1000) — 53

| ePhy number — 220 | Attribute — 221 | SAS address — 222 |
|---|---|---|
| 0 | S | 100 |
| 1 | S | 100 |
| 2 | S | 100 |
| 3 | S | 100 |
| 4 | D | 2000 |
| 5 | D | 2001 |
| 6 | D | 2002 |
| 7 | D | 2003 |
| 8 | D | 1001 |
| 9 | D | 1001 |
| 10 | D | 1001 |
| 11 | D | 1001 |
| 8 | T | 2010 |
| 9 | T | 2011 |
| 10 | T | 2012 |
| 11 | T | 2013 |
| .. | .. | .. |

53a, 53e, 53m

Primary EXPRT (EXP #1001) — 53

| ePhy number — 220 | Attribute — 221 | SAS address — 222 |
|---|---|---|
| 0 | S | 1000 |
| 1 | S | 1000 |
| 2 | S | 1000 |
| 3 | S | 1000 |
| 4 | D | 2010 |
| 5 | D | 2011 |
| 6 | D | 2012 |
| 7 | D | 2013 |
| 8 | D | 1002 |
| 9 | D | 1002 |
| 10 | D | 1002 |
| 11 | D | 1002 |
| 8 | T | 2020 |
| 9 | T | 2021 |
| 10 | T | 2022 |
| 11 | T | 2023 |
| .. | .. | .. |

Fig. 8

Secondary EXPRT (EXP #1100) — 53

| ePhy number | Attribute | SAS address |
|---|---|---|
| 0 | S | 101 |
| 1 | S | 101 |
| 2 | S | 101 |
| 3 | S | 101 |
| 4 | D | 2000 |
| 5 | D | 2001 |
| 6 | D | 2002 |
| 7 | D | 2003 |
| 8 | D | 1101 |
| 9 | D | 1101 |
| 10 | D | 1101 |
| 11 | D | 1101 |
| 8 | T | 2010 |
| 9 | T | 2011 |
| 10 | T | 2012 |
| 11 | T | 2013 |
| .. | .. | .. |

Secondary EXPRT (EXP #1101) — 53

| ePhy number | Attribute | SAS address |
|---|---|---|
| 0 | S | 1100 |
| 1 | S | 1100 |
| 2 | S | 1100 |
| 3 | S | 1100 |
| 4 | D | 2010 |
| 5 | D | 2011 |
| 6 | D | 2012 |
| 7 | D | 2013 |
| 8 | D | 1102 |
| 9 | D | 1102 |
| 10 | D | 1102 |
| 11 | D | 1102 |
| 8 | T | 2020 |
| 9 | T | 2021 |
| 10 | T | 2022 |
| 11 | T | 2023 |
| .. | .. | .. |

Fig. 15

Primary CTLRT — 54

| Device SAS address — 210 | SAS port number — 211 | Dedicated port number — 212 |
|---|---|---|
| 1000 | 0 | 0' — 54a |
| 2000 | 0 | 0' — 54b |
| 2001 | 0 | 0' |
| 2002 | 0 | 0' |
| 2003 | 0 | 0' |
| 1001 | 0 | 0' |
| 2010 | 0 | 0' |
| 2011 | 0 | 0' |
| 2012 | 0 | 0' |
| 2013 | 0 | 0' |
| .. | .. | .. |

Secondary CTLRT — 54

| Device SAS address — 210 | SAS port number — 211 | Dedicated port number — 212 |
|---|---|---|
| 1100 | 0 | 0' |
| 2000 | 0 | 0' |
| 2001 | 0 | 0' |
| 2002 | 0 | 0' |
| 2003 | 0 | 0' |
| 1101 | 0 | 0' |
| 2010 | 0 | 0' |
| 2011 | 0 | 0' |
| 2012 | 0 | 0' |
| 2013 | 0 | 0' |
| .. | .. | .. |

Fig. 16

Primary EXPRT (EXP #1000) — 55

| ePhy number | Attribute | SAS address |
|---|---|---|
| 0 | S | 100' |
| 1 | S | 0001 |
| 2 | S | 0001 |
| 3 | S | 0001 |
| 4 | D | 2000 |
| 5 | D | 2001 |
| 6 | D | 2002 |
| 7 | D | 2003 |
| 8 | D | 1001 |
| 9 | D | 1001 |
| 10 | D | 1001 |
| 11 | D | 1001 |
| 8 | T | 2010 |
| 9 | T | 2011 |
| 10 | T | 2012 |
| 11 | T | 2013 |
| .. | .. | .. |

Primary EXPRT (EXP #1001) — 55

| ePhy number | Attribute | SAS address |
|---|---|---|
| 0 | S | 1000 |
| 1 | S | 1000 |
| 2 | S | 1000 |
| 3 | S | 1000 |
| 4 | D | 2010 |
| 5 | D | 2011 |
| 6 | D | 2012 |
| 7 | D | 2013 |
| 8 | D | 1002 |
| 9 | D | 1002 |
| 10 | D | 1002 |
| 11 | D | 1002 |
| 8 | T | 2020 |
| 9 | T | 2021 |
| 10 | T | 2022 |
| 11 | T | 2023 |
| .. | .. | .. |

Fig. 17

Secondary EXPRT (EXP #1100) — 53

| ePhy number 220 | Attribute 221 | SAS address 222 |
|---|---|---|
| 0 | S | 101' |
| 1 | S | 101 |
| 2 | S | 101 |
| 3 | S | 101 |
| 4 | D | 2000 |
| 5 | D | 2001 |
| 6 | D | 2002 |
| 7 | D | 2003 |
| 8 | D | 1101 |
| 9 | D | 1101 |
| 10 | D | 1101 |
| 11 | D | 1101 |
| 8 | T | 2010 |
| 9 | T | 2011 |
| 10 | T | 2012 |
| 11 | T | 2013 |
| .. | .. | .. |

Secondary EXPRT (EXP #1101) — 53

| ePhy number 220 | Attribute 221 | SAS address 222 |
|---|---|---|
| 0 | S | 1100 |
| 1 | S | 1100 |
| 2 | S | 1100 |
| 3 | S | 1100 |
| 4 | D | 2010 |
| 5 | D | 2011 |
| 6 | D | 2012 |
| 7 | D | 2013 |
| 8 | D | 1102 |
| 9 | D | 1102 |
| 10 | D | 1102 |
| 11 | D | 1102 |
| 8 | T | 2020 |
| 9 | T | 2021 |
| 10 | T | 2022 |
| 11 | T | 2023 |
| .. | .. | .. |

Fig. 22

| Output SAS port selection table — 70 | |
|---|---|
| Command type ⌐301 | Output SAS port number ⌐302 |
| SSP | 0, 1 — 70a |
| SMP | 0, 1 — 70b |
| SES | 0', 1' — 70c |
| Other | 0, 1 — 70d |

STORAGE SYSTEM, STORAGE CONTROL APPARATUS AND METHOD FOR FAILURE RECOVERY

TECHNICAL FIELD

The present invention relates to technology for a storage system, and a storage control apparatus and method.

BACKGROUND ART

As an interface for coupling multiple storage devices, there is SAS (Serial Attached SCSI). The SAS is able to couple multiple storage devices using an SAS EXPANDER (herein after referred to as "EXP"), and, in addition, the EXPs can also be cascade coupled.

A storage system, which uses SAS, can increase availability by using the EXPs to make a communication path to a storage device redundant. For example, Patent Literature 1 discloses technology for making a communication path to a storage device redundant using EXPs.

CITATION LIST

Patent Literature

[PTL 1]
Japanese Patent Application Laid-open No. 2009-211140

SUMMARY OF INVENTION

Technical Problem

When a failure occurs in one communication path, a redundant storage system switches operation to a redundant other communication path. However, the redundancy of the storage system is lowered during operations carried out by switching to the other communication path. That is, the availability of the storage system decreases. Also, a certain amount of time is needed to switch operations to the redundant other communication path. It is preferable that the time required for this switchover be as short as possible.

An object of the present invention is to provide a storage system, and a storage control apparatus and method via which the time required to switch operation to a redundant communication path when a failure occurs is shortened.

Solution to Problem

A storage system comprises a storage device for storing data, a control apparatus which controls the storage device and comprises multiple communication ports, and a switch apparatus which expands the number of storage device couplings and comprises multiple communication ports, the respective multiple communication ports of the control apparatus are coupled to the respective multiple communication ports of the switch apparatus, and the switch apparatus is coupled to the storage device. The control apparatus configures at least one communication port of the multiple communication ports of the control apparatus, to a dedicated communication port, which outputs only a prescribed command issued when a failure is detected.

Advantageous Effects of Invention

According to the present invention, it is possible to provide a storage system, and a storage control apparatus and method which shortens the time required to switch operations to a redundant communication path when a failure occurs.

BRIEF DESCRIPTION OF DRAWINGS

FIG. 6 is an example of the data configuration of a CTLRT 52.
FIG. 7 is an example of an EXPRT 53 data configuration stored in a primary EXP 12 forming a primary communication path 100a.
FIG. 8 is an example of an EXPRT 53 data configuration stored in a secondary EXP 12 forming a secondary communication path 100b.
FIG. 15 is an example of the data configuration of a CTLRT 54 stored by the SASCTL 20 in the dedicated port mode.
FIG. 16 is an example of the data configuration of an EXPRT 53 stored in the primary EXP 12 forming the primary communication path 100a in the dedicated port mode.
FIG. 17 is an example of the data configuration of the EXPRT 53 stored in the secondary EXP 12 forming the secondary communication path 100b in the dedicated port mode.
FIG. 22 is an example of a data configuration diagram of an output SAS port selection table 70 stored in the SASCTL 20.

DESCRIPTION OF EMBODIMENTS

In the embodiments, a storage control apparatus, which comprises multiple physical communication ports, configures at least one or more communication ports of the multiple communication ports to a dedicated communication port, which outputs only a prescribed command issued when a failure is detected. The embodiments will be described hereinbelow with reference to drawings. In the following explanation, the same parent reference sign is appended to like elements, and in a case where like elements are explained individually, the explanation will be given by appending a child reference sign to the parent reference sign. In a case where an explanation is given without making a distinction between like elements, the explanation will use only the parent reference sign.

First Embodiment

Figure 1:
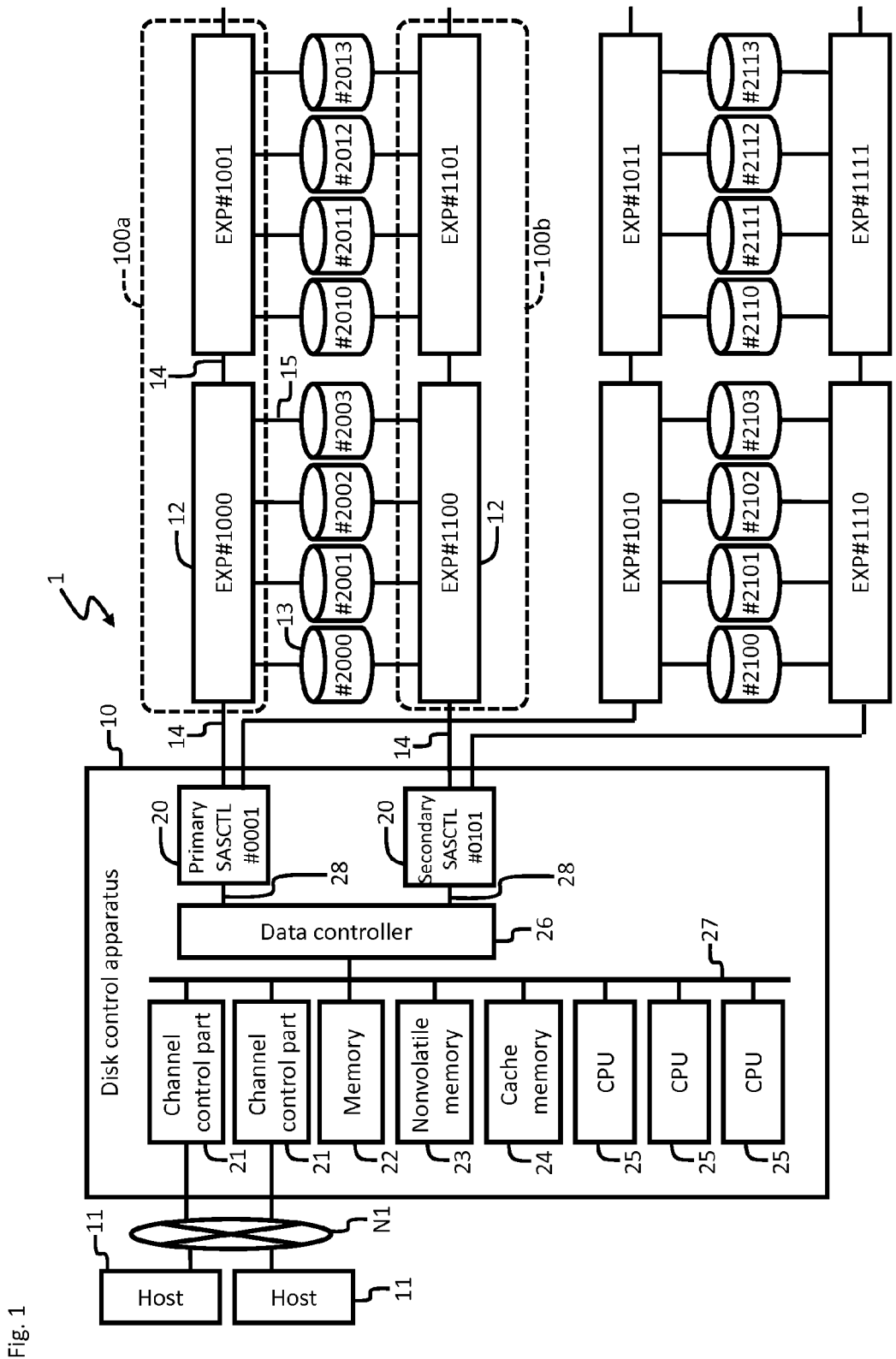
FIG. 1 is a block diagram of a hardware configuration of a storage system.

FIG. 1 shows a block diagram of a hardware configuration of a storage system.

The storage system 1 comprises a storage control apparatus 10, multiple EXPs 12, and multiple storage devices 13. A SASCTL (SAS CONTROLLER) 20, which is included in the storage control apparatus 10, is coupled to the EXPs 12 via a communication cable 14. The EXPs 12 are cascade-coupled via the communication cables 14. The respective multiple storage devices 13 are coupled to the EXPs 12 via a communication cable 15. The storage control apparatus 10, the EXPs 12, the SASCTL 20, and the storage devices 13 conform to the SAS protocol. However, another protocol related to storage control may be used instead of the SAS protocol.

The storage control apparatus 10 comprises a primary SASCTL 20 and a secondary SASCTL 20. Each SASCTL 20 is cascade-coupled to multiple EXPs 12. A communication path formed by EXPs 12 cascade-coupled from the primary SASCTL 20 is referred to as a primary communication path 100a. A communication path formed by EXPs 12 cascade-coupled from the secondary SASCTL 20 is referred to as a secondary communication path 100b. Hereinafter, these communication paths may be referred to as the communication path 100 in a case where neither the primary communication path 100a nor the secondary communication path 100b is specified. The storage control apparatus 10 is able to access the respective storage devices 13 from both the primary communication path 100a and the secondary communication path 100b. That is, the storage system 1 comprises redundant communication paths 100. As shown in FIG. 1, the storage system 1 may increase redundancy further by including one more set of the primary communication path 100a, the secondary communication path 100b, and the storage devices 13.

The EXP 12 is a type of switching device, which makes it possible to expand the number of storage device 13 couplings comprising the storage system 1. As explained herein above, multiple storage devices 13 can be coupled to an EXP 12, and the EXPs 12 can be cascade coupled. The storage control apparatus 10 can access a desired storage device 13 through a communication path 100 configured from multiple EXPs 12. The EXP 12 will be explained in detail further below.

The storage device 13 performs data input/output and storage through an SAS I/F (Interface). The storage device 13, for example, reads/writes and deletes data in accordance with a command issued from the storage control apparatus 10. The storage device 13, for example, is configured using either a SSD (solid state disk) or a HDD (Hard Disk Drive) or the like.

The storage control apparatus 10 controls the input/output of data to/from the storage device 13, and controls the EXP 12. The storage control apparatus 10, for example, issues a data write (read) command to the storage device 13, and writes (reads) data to (from) the storage device 13 in accordance with an instruction received from a host 11. The storage control apparatus 10, for example, issue a command to the EXP 12 requesting information, and acquires the information from the EXP 12 in accordance with an instruction received from the host 11 (or independently). The storage control apparatus 10 can access a desired storage device 13 from both the primary communication path 100a and the secondary communication path 100b.

The storage control apparatus 10 comprises multiple CPUs (Central Processing Unit) 25, a data controller 26, a memory 22, a nonvolatile memory 23, multiple channel control parts 21, a primary SASCTL 20 and a secondary SASCTL 20. The respective elements 21 through 26 are coupled via a bus 27, which enables two-way data communications. The data controller 26 and the SASCTL 20 are coupled via a communication bus 28, which enables two-way data communications.

The CPU 25 executes a program read from the nonvolatile memory 23 to realize the various functions of the storage control apparatus 10. The CPU 25 processes an instruction received from the host 11 via the channel control part 21. The CPU 25 sends a command and data to the EXP 12 and the storage device 13, and processes a command and data received from the EXP 12 and the storage device 13. The storage control apparatus 10 may comprise multiple CPUs 25 to increase processing speed and ensure redundancy.

The nonvolatile memory 23 can retain data even in a state in which power is not being supplied, and stores a program and data executed by the CPU 25. The nonvolatile memory 23, for example, is configured using a flash memory, a FeRAM (Ferroelectric Random Access Memory) or other such device.

The memory 22 is used as an area for storing data from the CPU 25 required for executing a program. The memory 22, for example, is configured using a DRAM (Dynamic Random Access Memory) or other such device.

The channel control part 21 is coupled to a communication network N1, and controls data communications via the communication network N1. The channel control part 21, for example, transfers data received from the host 11 to the CPU 25, and sends data issued from the CPU 25 to the host 11. For example, in a case where the communication network N1 is a SAN (Storage Area Network), the channel control part 21 is configured using a fibre channel HBA (Host Bus Adapter).

The SASCTL 20 controls data communications between the storage control apparatus 10 and the EXP 12 and storage device 13. The SASCTL 20 is coupled to the data controller 26. The SASCTL 20, for example, receives a command issued from the CPU 25 via the data controller 26 and sends this command to a prescribed storage device 13. The SASCTL 20, for example, transfers a command received from the storage device 13 to the CPU 25 via the data controller 26. The SASCTL 20, for example, is configured using a SAS HBA. The storage control apparatus 10 shown in FIG. 1 comprises two SASCTL 20, i.e. a primary SASCTL 20 and a secondary SASCTL 20. The primary SASCTL 20 forms the primary communication path 100a. The secondary SASCTL 20 forms the secondary communication path 100b. The SASCTL 20 will be explained in detail further below.

Figure 2:
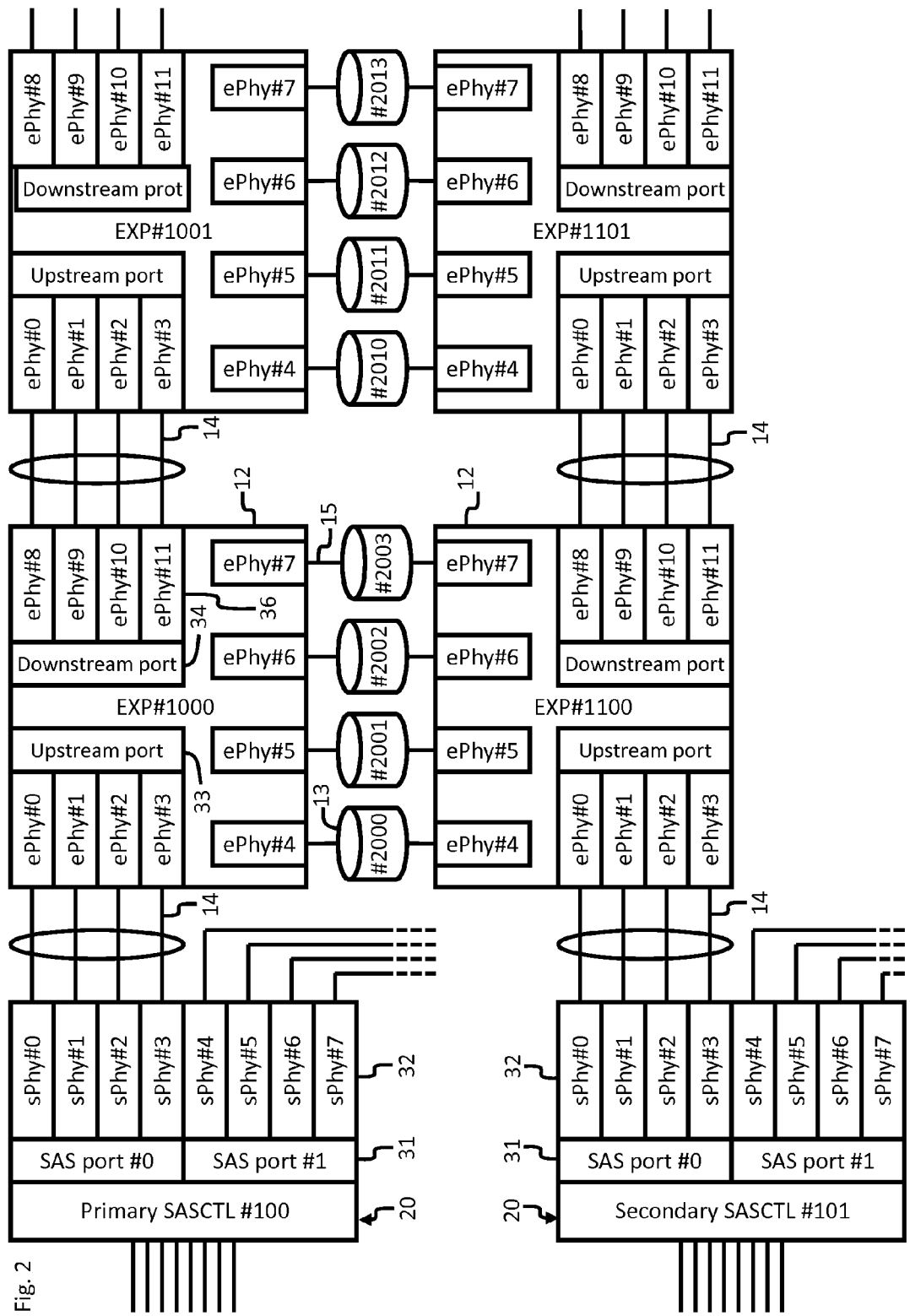
FIG. 2 is a block diagram of a coupling configuration of the storage system.

FIG. 2 shows a block diagram of the storage system coupling configuration.

The SASCTL 20 comprises multiple physical ports 32. The EXP 12 comprises multiple physical ports 36. The coupling configuration of this embodiment will be explained below, but the present invention is not limited to the relevant coupling configuration.

A uniquely identifiable SAS address is assigned to each SASCTL 20, EXP 12, and storage device 13 in the storage system 1. Hereinbelow, the SAS address of the SASCTL 20 may be expressed as "SASCTL 20 # (SAS address)", the SAS address of the EXP 12 may be expressed as "EXP 12 # (SAS address)", and the SAS address of the storage device 13 may be expressed as "storage device 13 # (SAS address)".

The SASCTL 20 comprises sPhys 32 #0 through #7 as the physical ports 32. The "sPhy 32 # (number)" here denotes the number assigned to each physical port 32 comprising the SASCTL 20. The SASCTL 20 can use the multiple physical ports 32 collectively as a single logical SAS port 31. The SASCTL 20, for example, uses sPhys #0 through #3 collectively as a single SAS port 31 #0, and uses sPhys #4 through #7 collectively as a single SAS port 31 #1.

The EXP 12 comprises ePhys 36 #0 through #11 as the physical ports 36. The "ePhy 36 # (number)" here denotes the number assigned to each physical port 36 comprising the EXP 12. Each of the sPhys #0 through #3, which belong to the SAS port 31 #0 of the SASCTL 20, and each of the ePhys #0 through #3 of a first-stage EXP 12 (that is, either an EXP 12 #1000 or an EXP 12 #1100) are coupled via a link 14. In the EXP 12, the ePhy 36 coupled to an upstream device may be collectively called an upstream port 33. The SAS port 31 and the upstream port 33 form a multilink. That is, communications between the SASCTL 20 and the EXP 12 are redundant. Furthermore, the multilink may be called a wide link, a wide link being an aggregate of multiple links 14. The link 14 may be a physical link, such as a communication cable or printed wiring, or may be a logical link, which is formed by applying time-division to a single physical link. In this embodiment, it is supposed that the link 14 is a physical link, and, more specifically, a communication cable.

Each of the ePhys #8 through #11 of the first-stage EXP 12 is coupled via a communication cable 14 to each of the ePhys #0 through #3 of a second-stage EXP 12 (that is, either an EXP 12 #1001 or an EXP 12 #1101). In the EXP 12, the ePhy 36 coupled to a downstream device may be collectively called a downstream port 34. The upstream port 33 and the downstream port 34 form a multilink. That is, communications between the EXPs 12 are redundant.

A storage device 13 is coupled to each of the ePhys #4 through #7 of the EXP 12 via a communication cable 15. The storage device 13 is coupled to both the EXP (herein after, referred to as "primary EXP 12") 12, which forms the primary communication path 100a, and the EXP (herein after, referred to as "secondary EXP") 12, which forms the secondary communication path 100b. This makes it possible for the storage control apparatus 10 to access the storage device 13 from either the primary communication path 100a or the secondary communication path 100b.

Figure 3:
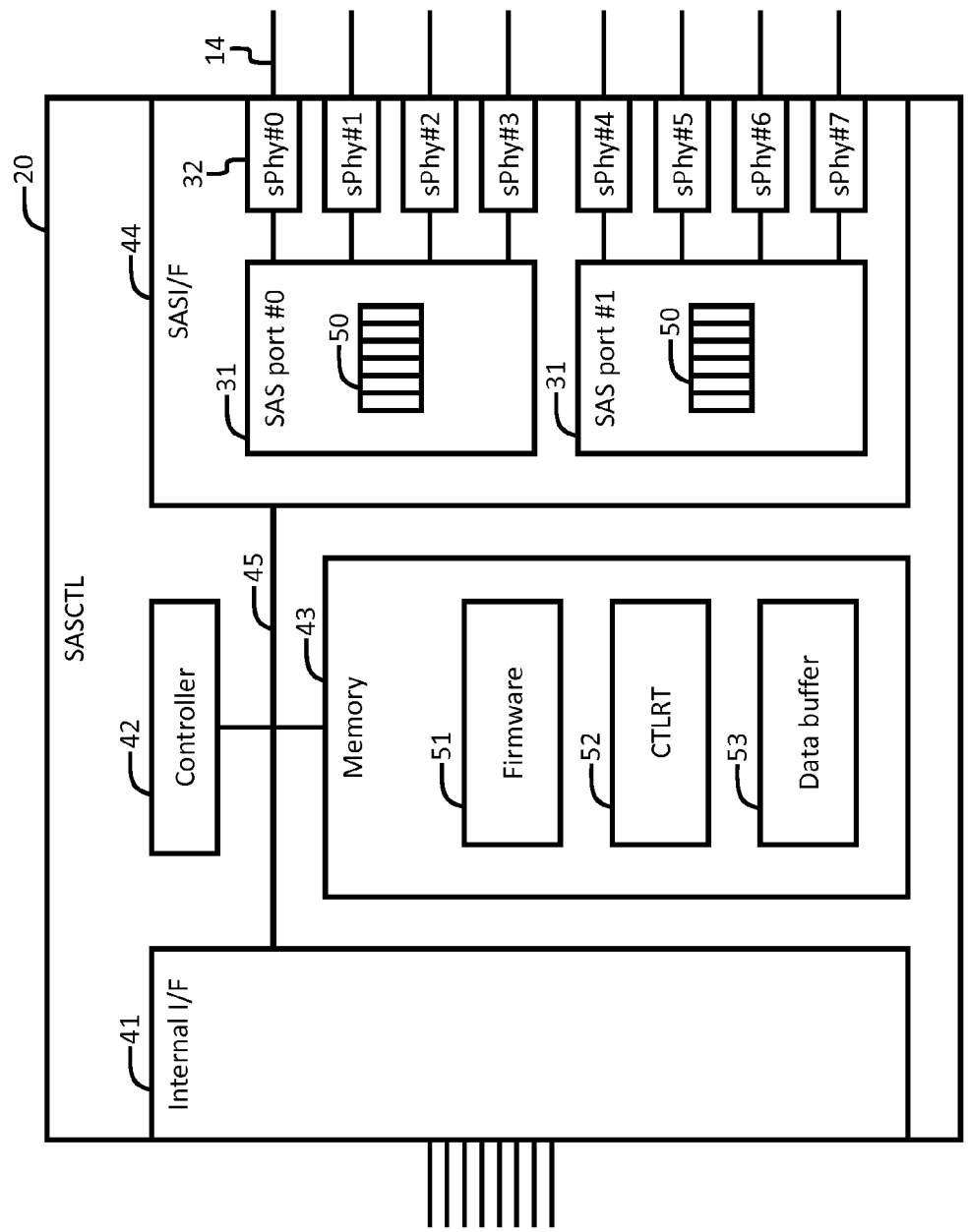
FIG. 3 is a block diagram of a hardware configuration and a functional configuration of a SASCTL 20.

FIG. 3 shows a block diagram of the hardware configuration and the functional configuration of the SASCTL 20.

The SASCTL 20 comprises a controller 42, a memory 43, an internal I/F 41, and a SAS I/F 44. Each element 41 through 44 is coupled via a bus 45, which enables the two-way transfer of data.

The SAS I/F 44, as described herein above, uses the sPhys 32 #0 through #3 collectively as a single SAS port 31 #0, and uses the sPhys 32 #4 through #7 collectively as a single SAS port 31 #1. The SAS port 31 #0 comprises a prescribed size FIFO (first-in, first-out) buffer 50, which is shared by the sPhys #0 through #3. Similarly, the SAS port 31 #1 comprises a FIFO buffer 50, which is shared by the sPhys #4 through #7. Commands, which are issued from the CPU 25, are stacked in the FIFO buffer 50. The commands stacked in the FIFO buffer 50 are outputted from any of the sPhy 32, which is not being used exclusively (is in a free state) at the time, in the order in which they were stacked.

The internal I/F 41 couples the SASCTL 20 to the data controller 26 (refer to FIG. 1). The internal I/F 41 controls the input/output of data between the SASCTL 20 and the data controller 26. The internal I/F 41, for example, is an I/F conforming to PCI-Express.

The controller 42 realizes various functions comprised by the SASCTL 20 in accordance with reading and executing firmware 51 stored in the memory 22. The controller 42 controls the CTLRT (SAS CONTROLLER Routing Table) 52 stored in the memory 22. The controller 42, for example, stores a command received from the CPU 25 of the storage control apparatus 10 via the internal I/F 41 in a data buffer 53 as needed. The controller 42 stacks a command stored in the data buffer 53 into the FIFO buffer 50 of the appropriate SAS port 31 by referencing the CTLRT 52. A command stacked in the FIFO buffer 50, as explained herein above, is outputted from any sPhy 32.

Figure 4:
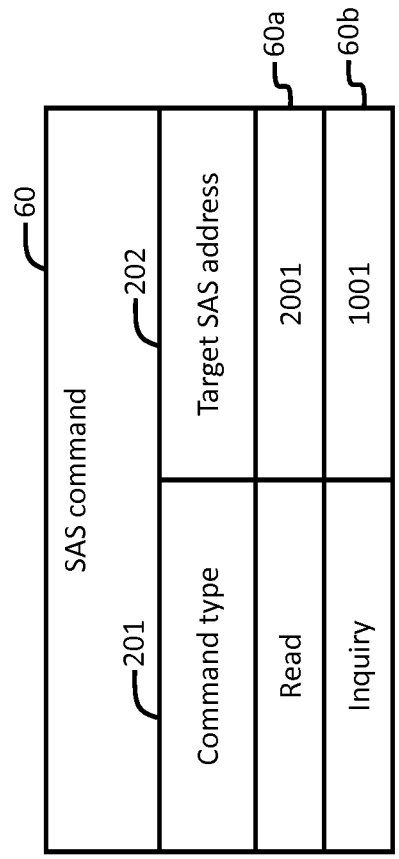
FIG. 4 is an example of a data configuration of a SAS command issued by a CPU 25 of a storage control apparatus 10.

FIG. 4 shows an example of the data configuration of a SAS command issued by the CPU 25 of the storage control apparatus 10.

An SAS command 60, for example, comprises the information command type 201 and target SAS address 202. Information for identifying the command is set in the command type 201. The SAS address assigned to the execution-target device of the relevant command is set in the target SAS address 202.

For example, the SAS command 60a shown in FIG. 4 is for requesting a "Read" (a data read) from the device at SAS address #1001 (that is, the storage device 13 #1001). The SAS command 60b is for requesting an "Inquiry" (the provision of prescribed information) from the device at SAS address #1001 (that is, the EXP #1001).

Figure 5:
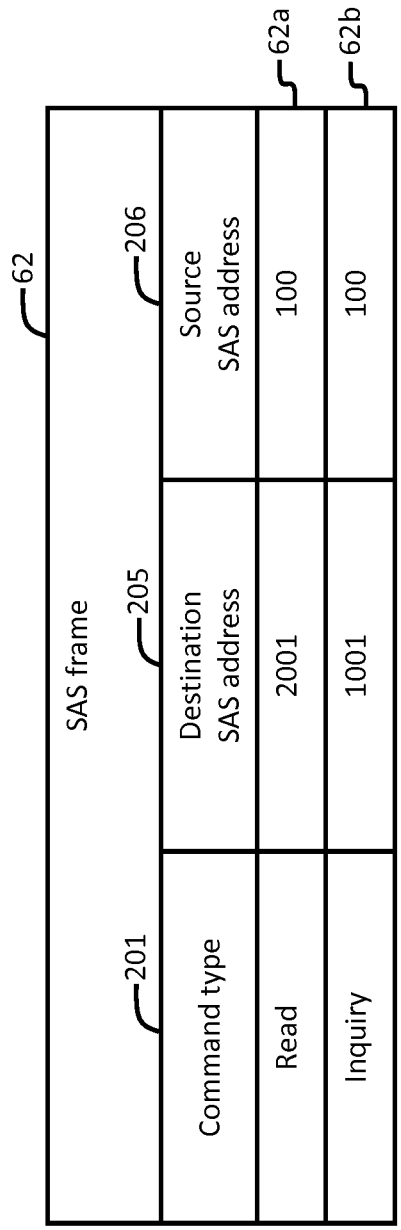
FIG. 5 is an example of the data configuration of a SAS frame issued by the SASCTL 20.

FIG. 5 shows an example of the data configuration of a SAS frame issued by the SASCTL 20.

A SAS frame 62, for example, comprises the information command type 201, destination SAS address 205, and source SAS address 206. The same as in FIG. 4, information for identifying the command is set in the command type 201. The SAS address assigned to the destination device of the relevant SAS frame 62 is set in the destination SAS address 205. The SAS address assigned to the source device of the relevant SAS frame 62 is set in the source SAS address 206.

For example, the SAS frame 62a shown in FIG. 5 is for sending a "Read" command to a destination device at SAS address #2001 (that is, the storage device 13 #2001) from a source device at SAS address #100 (that is, the primary SASCTL 20 #100).

The SAS frame 62b is for sending an "Inquiry" command to a destination device at SAS address #1001 (that is, the EXP 12 #1001) from a source device at SAS address #100 (that is, the primary SASCTL 20 #100).

FIG. 6 shows an example of the data configuration of the CTLRT 52. The primary SASCTL 20 stores a primary CTLRT 52, and the secondary SASCTL 20 stores a secondary CTLRT 52.

The CTLRT 52 manages a corresponding relationship between a SAS address 210 of a device capable of being accessed from the SASCTL 20, and a SAS port number 211, which is able to access this device. That is, the command outputted from the SAS port 31 shown in the SAS port number 211 can reach the device shown in the SAS address 210.

For example, a record 52b of the primary CTLRT 52 shows that it is possible to access the device at SAS address #2000 (that is, the storage device 13 #2000) through the SAS port 31 #0. The same holds true for the secondary CTLRT 52.

FIG. 7 is an example of the data configuration of an EXPRT 53 stored by the primary EXP 12, which forms the primary communication path 100a.

FIG. 8 is an example of the data configuration of the EXPRT 53 stored in the secondary EXP 12, which forms the secondary communication path 100b.

The EXPRT (SAS EXPANDER Routing Table) 53 manages the corresponding relationship between a ePhy 36 number (herein after referred to as "ePhy number") 220 included in its own EXP 12 (that is, the EXP 12 storing the EXPRT 53), a SAS address 222 of a device capable of being accessed from the ePhy number 220, and an attribute 221, which shows the physical relationship between its own EXP 12 and the device shown in the SAS address 222.

The attribute 221 "S" indicates that the device shown in the SAS address 222 is directly coupled upstream of its own EXP 12. The attribute 221 "D" indicates that the device shown in the SAS address 222 is directly coupled downstream of its own EXP 12. The attribute 221 "T" indicates that the device shown in the SAS address 222 is indirectly coupled downstream of its own EXP 12. The EXP 12, upon receiving the SAS frame 62, references this EXPRT 53 to determine whether the SAS frame 62 should be transferred to any of the devices.

For example, a record 53a of the EXPRT 53 stored by the first-stage primary EXP 12 #1000 shows that the device at the SAS address #100 (that is, the SASCTL 20 #100) is directly coupled through ePhy #0 upstream of the EXP 12 #1000. The record 53e shows that the device at the SAS address #2000 (that is, the storage device 13 #2000) is directly coupled through ePhy #4 downstream of its own EXP 12 #1000. The record 53m shows that the device at the SAS address #2010 (that is, the storage device 13 #2010) is indirectly coupled through ePhy #8 downstream of the EXP 12 #1000. The same holds true for the EXPRT 53 stored in the other primary EXP 12 #1001, the secondary EXP 12 #1100, and the secondary EXP 12 #1101.

Figure 9:
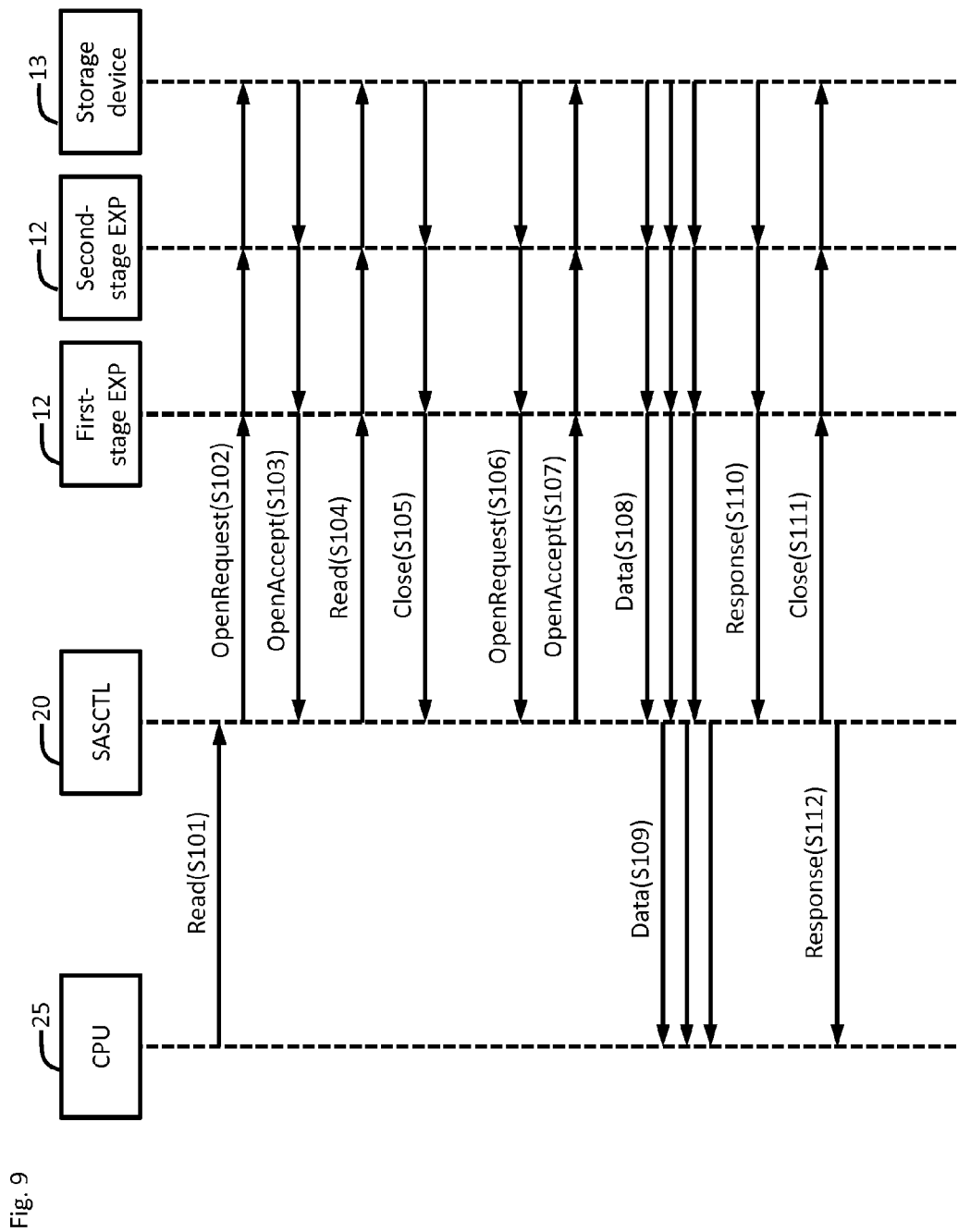
FIG. 9 is a sequence diagram of a process in which the CPU 25 of the storage control apparatus 10 reads data from a storage device 13 by controlling the SASCTL 20.

FIG. 9 shows a sequence diagram of a process in which the CPU 25 of the storage control apparatus 10 reads data from a storage device 13 by controlling the SASCTL 20.

The CPU 25 sends a Read command, which has a storage device 13 as the target, to the SASCTL 20 (S101).

The SASCTL 20, which receives this command, sends an OpenRequest command (SAS frame 62) requesting the establishment of a connection to the first-stage EXP 12 having the storage device 13 as the destination (S102). This OpenRequest command is transferred via the second-stage EXP 12 to reach the storage device 13, which is the destination.

In a case where a connection is able to be established, the storage device 13, which receives this command, sends an OpenAccept command, which includes a response to this effect, to the second-stage EXP 12 having the SASCTL 20 as the destination (S103). This OpenAccept command is transferred via the first-stage EXP 12 to reach the SASCTL 20, which is the destination. In accordance with this, a connection is established between the SASCTL 20 and the storage device 13. Hereinbelow, the explanation of the command transfer between the EXPs 12 will be omitted.

The SASCTL 20 sends a Read command to the storage device 13 through this established connection (S104). The storage device 13, which receives the Read command, sends a Close command to the SASCTL 20, and temporarily disconnects the connection (S105).

Then, the storage device 13 sends an OpenRequest command to the SASCTL 20 (S106). That is, the establishment of a connection with the SASCTL 20 is requested by the storage device 13.

In a case where a connection is able to be established, the SASCTL 20, which receives this command, returns an OpenAccept command to the storage device 13 (S107). In accordance with this, the connection between the storage device 13 and the SASCTL 20 is re-established. The storage device 13 reads the prescribed data, and sends this data to the SASCTL 20 through the established connection (S108).

The SASCTL 20 receives the data sent from the storage device 13 and transfers this data to the CPU 25 (S109).

The storage device 13, after reading all of the prescribed data, sends the SASCTL 20 a Response command (S110). That is, the storage device 13 notifies the SASCTL 20 of the fact that all of the prescribed data has been read.

The SASCTL 20, which receives this notification, sends the storage device 13 a Close command, and disconnects the connection (S111). Then, the SASCTL 20 returns a Response command to the effect that the Read has been completed to the CPU 25 (S112).

According to the above processing, the CPU 25 can read prescribed data from a desired storage device 13.

Figure 10:
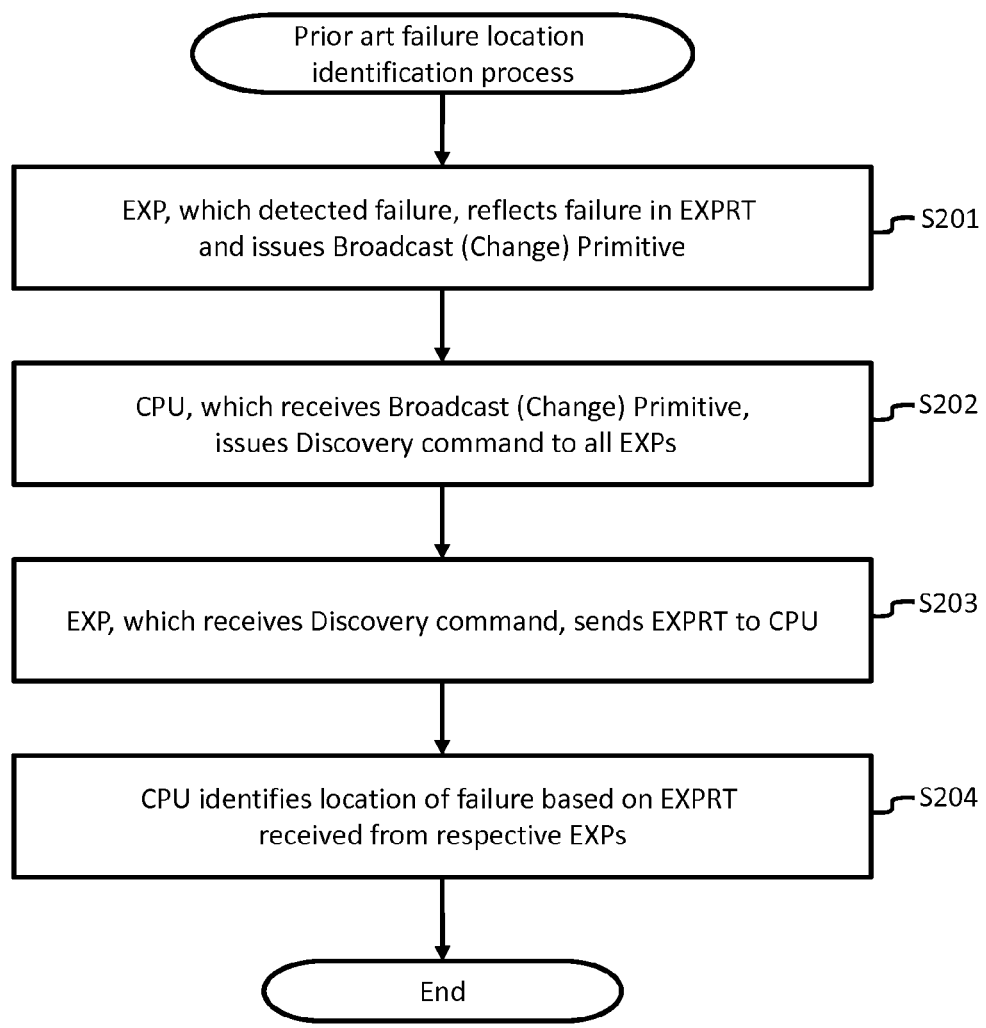
FIG. 10 is a flowchart of a process for identifying a location where a failure has occurred in a prior art storage system.

FIG. 10 shows a flowchart of a process for identifying the location where a failure has occurred in a prior art storage system.

The EXP 12, which detects the failure, reflects the change related to this failure in its own EXPRT 53, and issues a Broadcast (Change) Primitive command, which is one of the SAS commands (S201). Generally speaking, the occurrence of a failure is detected by the EXP 12 directly coupled to the device in which the failure occurred. This Broadcast (Change) Primitive command is transmitted to all devices.

The CPU 25, which receives the Broadcast (Change) Primitive command issues a Discovery command, which is one of the SAS commands, to all EXPs 12 through the SAS I/F 44 (S202). This is because information for identifying the device in which the failure occurred is not included in the Broadcast (Change) Primitive command. Consequently, the CPU 25 issues the Discovery command to identify the device in which the failure has occurred.

The EXP 12, which receives the Discovery command, sends the EXPRT 53 information, which it is storing, to the CPU 25 (S203). The CPU 25 identifies the location where the failure occurred based on the EXPRT 53 information received from each EXP 12 (S204). According to the above processing, the CPU 25 is able to identify the location where a failure has occurred.

However, in the prior art processing shown in FIG. 10, there is the concern that it will take a long time to identify the location where a failure has occurred. The reason for this will be explained below.

In Step S202 of the flowchart of FIG. 10, the CPU 25 issues a Discovery command. The Discovery command is outputted to the EXP 12 after being stacked in the FIFO buffer 50 of the SAS port 31 shown in FIG. 3. That is, the Discovery command is not outputted until after all the commands stacked prior thereto have been outputted. Therefore, in a case where a long time is needed to complete the previously stacked commands, the output of the Discovery command is delayed to that extent. That is, it takes a long time until the location of the failure is identified.

Hypothetically, it is supposed that an OpenRequest command, which has as its destination a device located further downstream than the location where a failure has occurred, exists among the previously stacked commands. In accordance with this, an OpenAccept command will not be returned with respect to the OpenRequest command, making it impossible to complete the OpenRequest command until a prescribed timeout period has elapsed. The timeout period is generally 150 msec, during which time one of the links (sPhy 32) of the SAS port 31 is used exclusively. Although the SAS port 31 comprises four links (sPhy 32), in a case where the other links are also being used exclusively by other previous commands, it will be a long time until the subsequently stacked Discovery command is outputted.

Consequently, the storage control apparatus 10 related to this embodiment comprises a dedicated port mode for solving the above-described problem. The storage control apparatus 10, which comprises the dedicated port mode, will be explained below.

Figure 11:
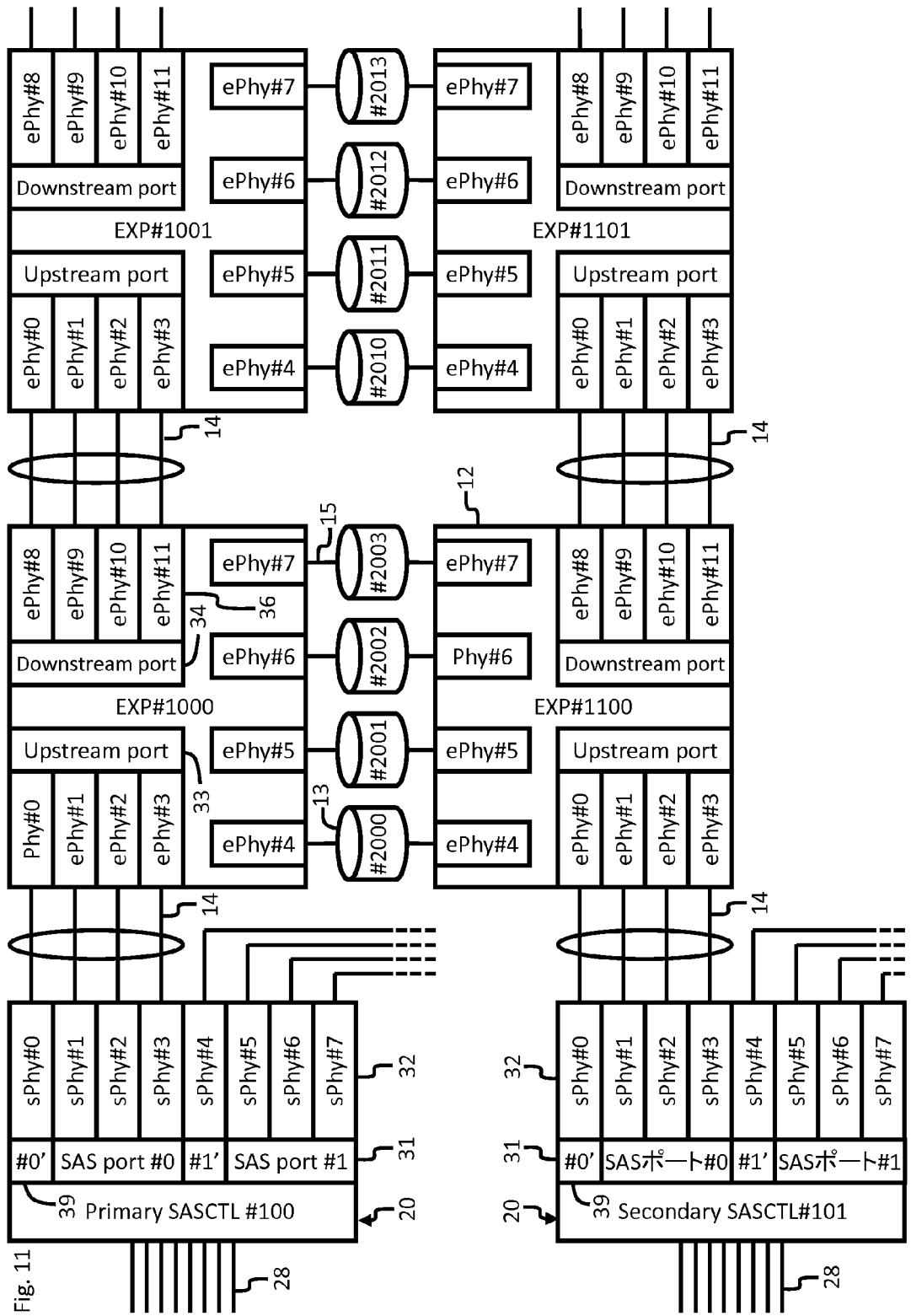
FIG. 11 is a block diagram of a coupling configuration in a case where the storage control apparatus 10 is operated in a dedicated port mode.

FIG. 11 shows a block diagram of a coupling configuration in a case where the storage control apparatus 10 operates in the dedicated port mode.

In the dedicated port mode, the storage control apparatus 10 uses at least one of the sPhy 32 of the multiple sPhys 32 comprising the SASCTL 20 as a dedicated logical SAS port (herein after referred to as "dedicated port") 39. The storage control apparatus 10 assigns a dedicated SAS address, which differs from the SAS address of the SASCTL 20, to the dedicated port 39. The storage control apparatus 10 collectively uses the sPhy 32 other than the sPhy 32 being used as the dedicated port 39 as a single logical SAS port 31.

For example, as shown in FIG. 11, the sPhy #0 in the primary SASCTL 20 #100 is used as a dedicated port 39 #0', and sPhy #4 is used as a dedicated port 39 #1'. Then, a SAS address #100' is assigned to the dedicated port 39 #0', and a SAS address #100" is assigned to the dedicated port 39 #1'. The sPhys #1 through #3 are used as the single SAS port 31 #0 the same as usual, and the sPhys #5 through #7 are used as the single SAS port 31 #1 the same as usual. That is, the dedicated ports 39 #0' and #1' each secure one link, and the ordinary SAS ports 31 #0 and #1 each secure three links.

In the dedicated port mode, the storage control apparatus 10 does not use the dedicated port 39 to output a command in a case where the storage system 1 is operating normally (a case where a failure has not been detected). Then, in a case where a storage system 1 failure has been detected, the storage control apparatus 10 uses the dedicated port 39 to output a prescribed command. The prescribed command will be explained in detail further below. Next, the SASCTL 20 will be explained in a case where the dedicated port mode is in operation.

Figure 12:
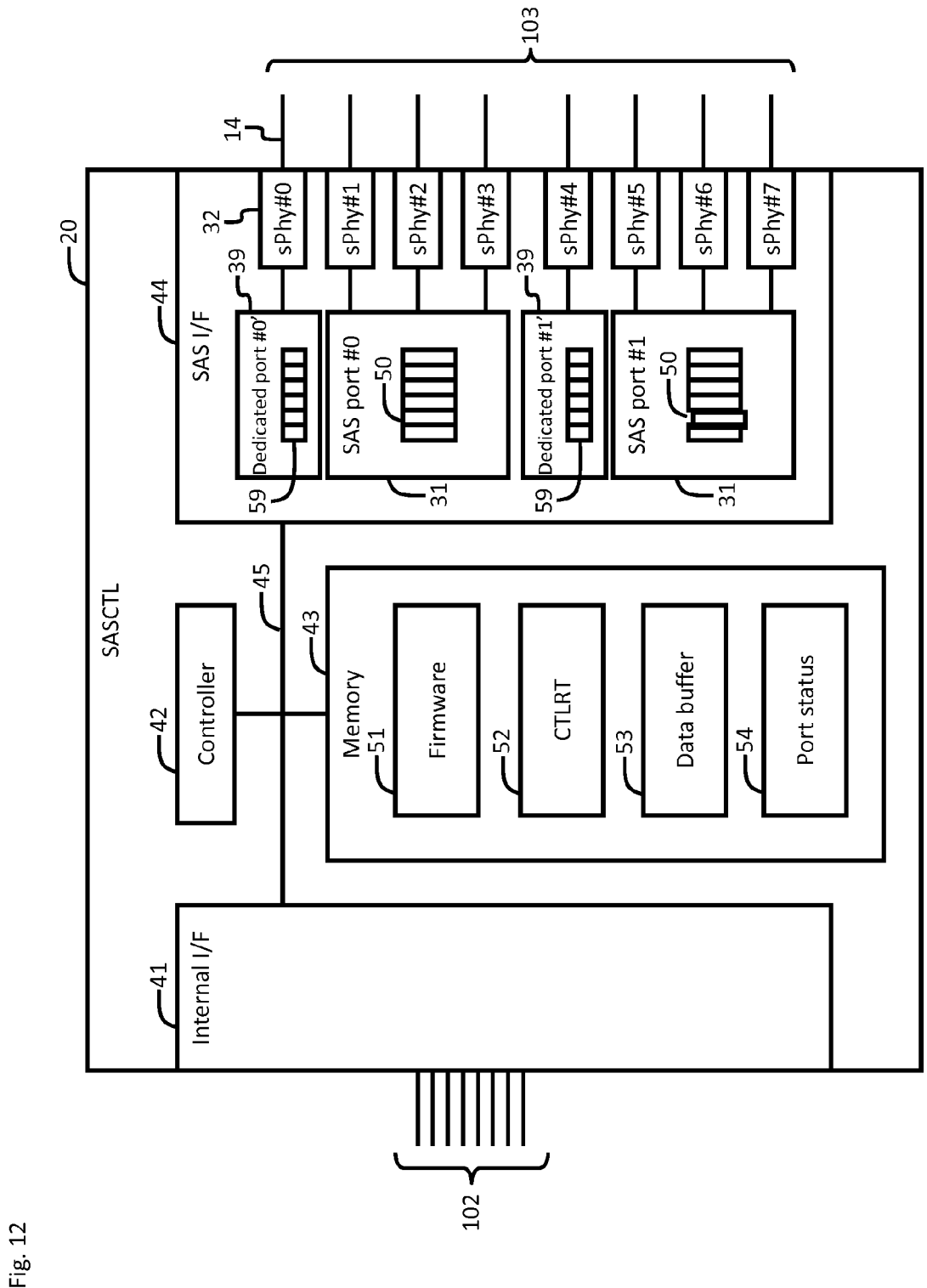
FIG. 12 is a block diagram of a physical configuration and the functional configuration of the SASCTL 20 in the dedicated port mode.

FIG. 12 shows a block diagram of the physical configuration and the functional configuration of the SASCTL 20 in the dedicated port mode.

In the dedicated port mode, the SASCTL 20 is basically the same as in FIG. 3, but comprises a dedicated FIFO buffer 59 in the dedicated port 39. That is, the SASCTL 20 comprises a separate FIFO 59, which is independent of the FIFO 50 in the normal SAS port 31, in the dedicated port 39.

For example, as shown in FIG. 12, the SASCTL 20 comprises a dedicated FIFO buffer 59 for the dedicated port 39 #0', and a dedicated FIFO buffer 59 for the dedicated port 39 #1'. That is, the dedicated FIFO buffer 59 for the dedicated port 39 #0' stacks only a command, which is outputted from the sPhy 32 #0. The FIFO buffer 50 of the SAS port 31 #0 is shared by the sPhys 32 #1 through #3 the same as in the past.

In the dedicated port mode, the CPU 25, in a case where a failure has been detected, issues to the dedicated port 39 a prescribed command for identifying the location of the failure. Since the dedicated port 39 is not used during normal operation, no commands have been stacked beforehand in the FIFO buffer 59. Therefore, the prescribed command issued from the CPU 25 is outputted immediately (in a short time) from the dedicated port 39. Accordingly, in the dedicated port mode, the storage control apparatus 10 is able to identify the location of a failure in a shorter period of time than in the past.

The above-described dedicated port 39 may be used for an operation other than outputting a prescribed command for identifying the location of a failure. For example, the dedicated port 39 may be used to output a prescribed command for resetting a device.

In addition, multiple sPhys 32 may be allocated to the above-described dedicated port 39. In accordance with this, the FIFO buffer 59 of the dedicated port 39 may be shared by the multiple sPhys 32 being used as the dedicated port 39.

Configuring the storage control apparatus 10 to operate in the dedicated port mode may be done by the user, or may be automatically configured by the storage control apparatus 10. For example, the storage control apparatus 10 may configure the dedicated port mode in a case where the storage control apparatus 10 compares the upstream communication bus bandwidth 102 related to the internal I/F 41 (for example, the PCIe serial bus bandwidth) to the downstream communication bus bandwidth 103 related to the SAS I/F 44 (for example, the total serial bus bandwidth of the respective sPhys 32), and the downstream communication bus bandwidth 103 is larger than the upstream communication bus bandwidth 102. This is because the downstream communication bus bandwidth 103 used for the normal SAS port 31 does not become extremely smaller than the upstream communication bus bandwidth 102 even when a portion of the downstream communication bus bandwidth 103 has been secured for the dedicated port 39.

In a case where a large amount of data has been inputted from the upstream communication bus when the downstream communication bus bandwidth 103 is extremely smaller than the upstream communication bus bandwidth 102, it becomes impossible to output all of this data to the downstream communication bus.

The storage control apparatus 10 may configure the dedicated port mode in a case where the difference between the downstream communication bus bandwidth 103 and the upstream communication bus bandwidth 102 is equal to or larger than a prescribed threshold. The storage control apparatus 10 may compare the total bandwidth of the input/output of the communication bus I/F 41 to the total bandwidth of the input/output of the SAS I/F 44. Or, the storage control apparatus 10 may compare the input (output) bandwidth of the communication bus I/F 41 to the output (input) bandwidth of the SAS I/F 44.

A port status 54 shown in FIG. 12 stores the open and closed state of each sPhy 32. The port status 54 is used in the processing shown in FIG. 21, which will be explained further below.

Figure 13:
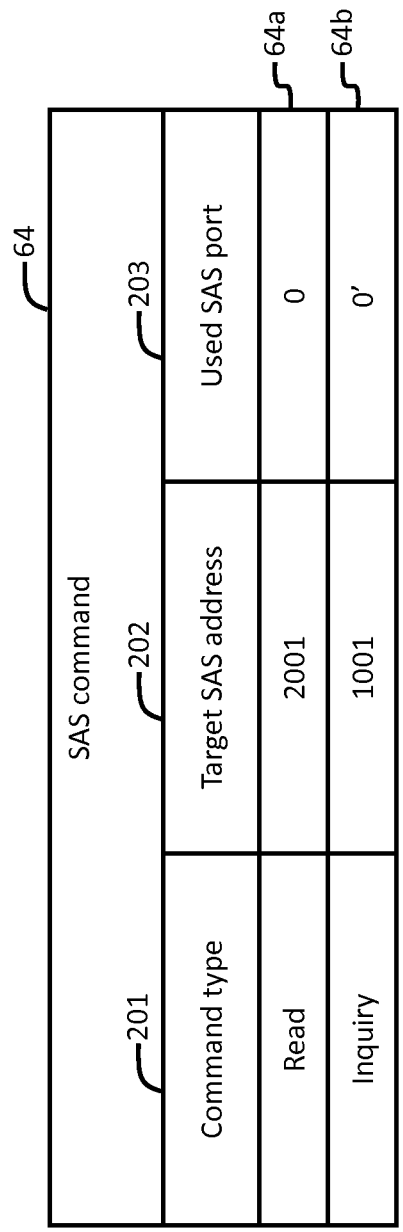
FIG. 13 is an example of the data configuration of a command issued by the CPU 25 of the storage control apparatus 10 in the dedicated port mode.

FIG. 13 shows an example of the data configuration of a command issued by the storage control apparatus 10 CPU 25 in the dedicated port mode.

In the dedicated port mode, in addition to the information shown in FIG. 4, the SAS command 64 comprises the information used SAS port 203.

The used SAS port 203 is information for identifying either the SAS port 31 or the dedicated port 39 for outputting the SAS command 64. The number of either the SAS port 31 or the dedicated port 39 is set in the used SAS port 203.

For example, the SAS command 64a shown in FIG. 13 is for requesting a "Read" from the device at SAS address #2001 (that is, the storage device 13 #2001) using the SAS port 31 #0. The SAS command 60b is for requesting an "Inquiry" from the device at SAS address #1001 (that is, the EXP 12 #1001) using the dedicated port 39 #0'.

Figure 14:
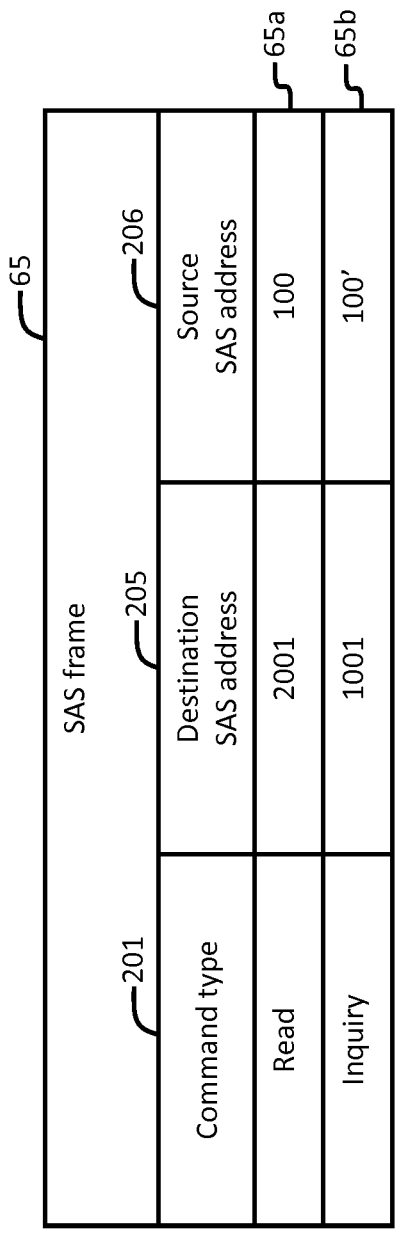
FIG. 14 is an example of the data configuration of a SAS frame 65 issued by the SASCTL 20 in the dedicated port mode.

FIG. 14 shows an example of the data configuration of the SAS frame 65 issued by the SASCTL 20 in the dedicated port mode.

In the dedicated port mode, the data configuration of the SAS frame 65 is the same as that of FIG. 5. However, in the case of the dedicated port mode, the SAS address set in the source SAS address 206 will differ for the SAS frame 65 outputted from the dedicated port 39 and the SAS frame 65 outputted from the normal SAS port 31. That is, the SAS address assigned to the dedicated port 39 is set in the source SAS address 206 of the SAS frame 65 outputted from the dedicated port 39, and the SAS address assigned to the SASCTL 20 is set in the source SAS address 206 of the SAS frame 65 outputted from the normal SAS port 31.

For example, a SAS frame 65a shown in FIG. 14 indicates that the command type 201 is "Read", the device at SAS address #100 (that is, the SASCTL 20 #100) is the source, and the device at SAS address #2001 (that is, the storage device 13 #2001) is the destination. A SAS frame 65b indicates that the command type 201 is "Inquiry", the device at SAS address #100' (that is, the dedicated port 39 #0') is the source, and the device at SAS address #1001 (that is, the EXP 12 #1001) is the destination.

The data configuration of the SAS frame 65 shown in FIG. 14 conforms to the SAS standard. Therefore, the storage control apparatus 10 can be operated in the dedicated port mode without modifying the EXP 12 and the storage device 13 conforming to the SAS standard at all.

FIG. 15 is a diagram showing an example of the data configuration of a CTLRT 54 stored in the SASCTL 20 in the dedicated port mode.

In the dedicated port mode, the SASCTL 20 also manages the corresponding relationship with a dedicated port number 212 in addition to the information shown in FIG. 6. This is because a device related to the SAS address 210 can be accessed from both the normal SAS port 31 and the dedicated port 39.

For example, as shown in FIG. 15, a record 54a of the primary CTLRT 54 indicates that the device at SAS address #1000 (that is, the EXP 12 #1000) is accessible from the SAS port 31 #0 and the dedicated port 39 #0'. A record 54b indicates that the device at SAS address #2000 (that is, the storage device 13 #2000) is accessible from the SAS port 31 #0 and the dedicated port 39 #0'. The same holds true for the secondary CTLRT 54.

FIG. 16 shows an example of the data configuration of the EXPRT 55 stored in the primary EXP 12 forming the primary communication path 100a in the dedicated port mode.

FIG. 17 shows an example of the data configuration of the EXPRT 55 stored in the secondary EXP 12 forming the secondary communication path 100b in the dedicated port mode.

Even in the dedicated port mode, the data configuration of the EXPRT 55 is the same as that of FIG. 7 and FIG. 8. However, for the dedicated port mode EXPRT 55, the SAS address assigned to the dedicated port 39 can be set in the SAS address 222.

For example, a record 55a of the EXPRT 55 stored in the first-stage primary EXP 12 #1000 indicates that the device at SAS address #100' (that is, the dedicated port 39 #0') is directly coupled upstream of its own EXP 12 #1000 through ePhy #0.

The data configurations of the EXPRTs 53 shown in FIG. 16 and FIG. 17 conform to the SAS standard. Therefore, the storage control apparatus 10 can be operated in the dedicated port mode without modifying the EXP 12 and the storage device 13 conforming to the SAS standard at all.

Figure 18:
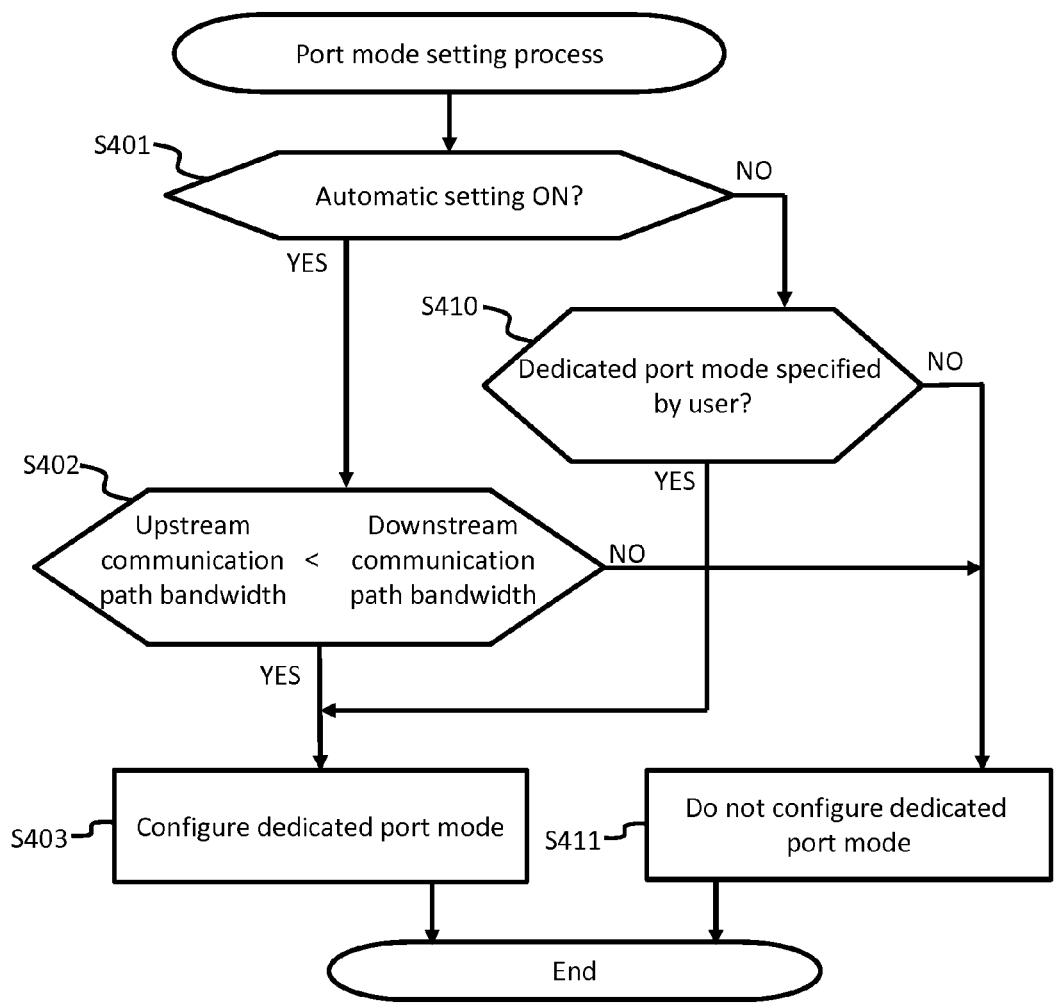
FIG. 18 is a flowchart of a port mode setting process in the storage control apparatus 10.

FIG. 18 shows a flowchart of a port mode setting process in the storage control apparatus 10. The processing shown in FIG. 18, for example, is executed when the storage control apparatus 10 is booted up.

The storage control apparatus 10 determines whether or not the port mode automatic setting is ON. The user configures this automatic setting to ON/OFF (S401).

A case in which the automatic setting is ON (S401: YES) will be explained first. The storage control apparatus 10 compares the SASCTL 20 upstream communication bus bandwidth 102 (refer to FIG. 12) to the downstream communication bus bandwidth 103 (refer to FIG. 12) (S402).

In a case where the downstream communication bus bandwidth 103 is larger than the upstream communication bus bandwidth 102 (S402: YES), the storage control apparatus 10 configures the dedicated port mode (S403) and ends this processing.

In a case where the downstream communication bus bandwidth 103 is not larger than the upstream communication bus bandwidth 102 (S402: NO), the storage control apparatus 10 ends this processing without configuring the dedicated port mode (S411).

A case in which the automatic setting is OFF (S401: NO) will be explained next. The storage control apparatus 10 determines whether or not the dedicated port mode has been specified by the user (S410).

In a case where the dedicated port mode has been specified by the user (S410: YES), the storage control apparatus 10 configures the dedicated port mode (S403) and ends this processing.

In a case where the dedicated port mode has not been specified by the user (S410: NO), the storage control apparatus 10 ends this processing without configuring the dedicated port mode 39 (S411).

According to the processing described herein above, the storage control apparatus 10 is operated in the dedicated port mode in a case where a prescribed condition is satisfied.

Figure 19:
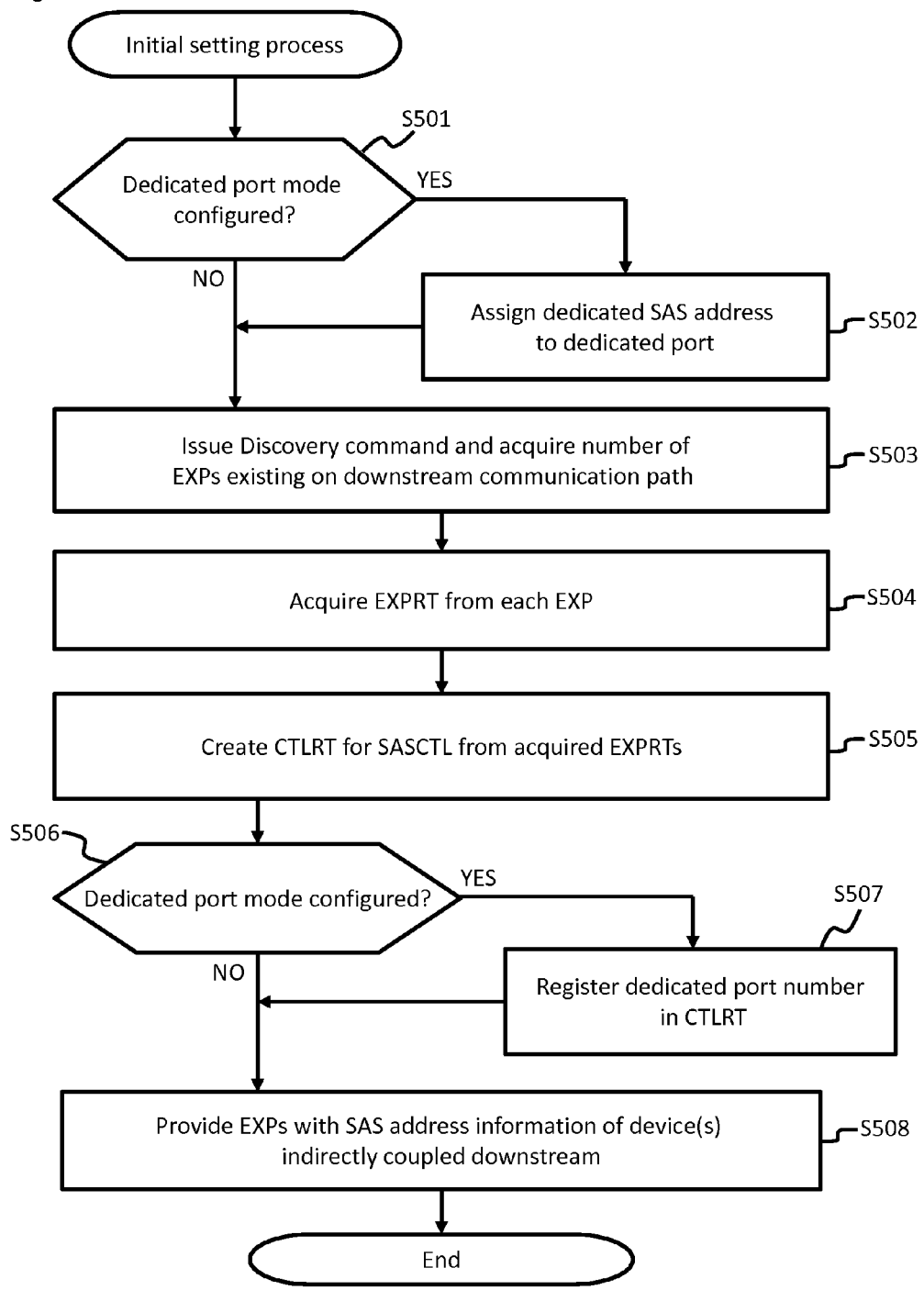
FIG. 19 is a flowchart of an initial setting process in the storage control apparatus 10.

FIG. 19 shows a flowchart of an initial setting process in the storage control apparatus 10. The processing shown in FIG. 19 is executed after the processing shown in FIG. 18.

The storage control apparatus 10 determines whether or not the dedicated port mode is configured (S501).

In a case where the dedicated port mode is configured (S501: YES), the storage control apparatus 10 assigns a dedicated SAS address to the dedicated port 39 (S502), and proceeds to the next Step S503. In a case where the dedicated port mode is not configured (S501: NO), the storage control apparatus 10 proceeds to the next Step S503 as-is.

The storage control apparatus 10 issues the Discovery command, and acquires the number of EXPs 12, which exist on the downstream communication bus 100 (S503). The storage control apparatus 10 then acquires the EXPRT 53 of each EXP 12 (S504). The storage control apparatus 10 creates a CTLRT 52 based on the acquired EXPRTs 53 (S505).

The storage control apparatus 10 determines whether or not the dedicated port mode is configured (S506).

In a case where the dedicated port mode is configured (S506: YES), the storage control apparatus 10 registers the dedicated port number 212 in the CTLRT 52 (S507), and proceeds to Step S508.

In a case where the dedicated port mode is not configured (S506: NO), the storage control apparatus 10 proceeds to Step S508.

The storage control apparatus 10 identifies the SAS address of the device indirectly coupled downstream of the respective EXPs 12 based on the EXPRTs 53 acquired from the EXPs 12, and provides this information to the respective EXPs 12 (S508). Each EXP 12 registers the provided information in the EXPRT 53. In accordance with this, the dedicated SAS address assigned to the dedicated port 39 is registered in the SAS address 222 of each EXPRT 53 when the dedicated port mode has been configured.

According to the above processing, in a case where the dedicated port mode has been configured, the CTLRT 52 shown in FIG. 15 is set in the SASCTL 20. In a case where the dedicated port mode has been configured, the EXPRTs 53 shown in FIG. 16 and FIG. 17 are set.

Figure 20:
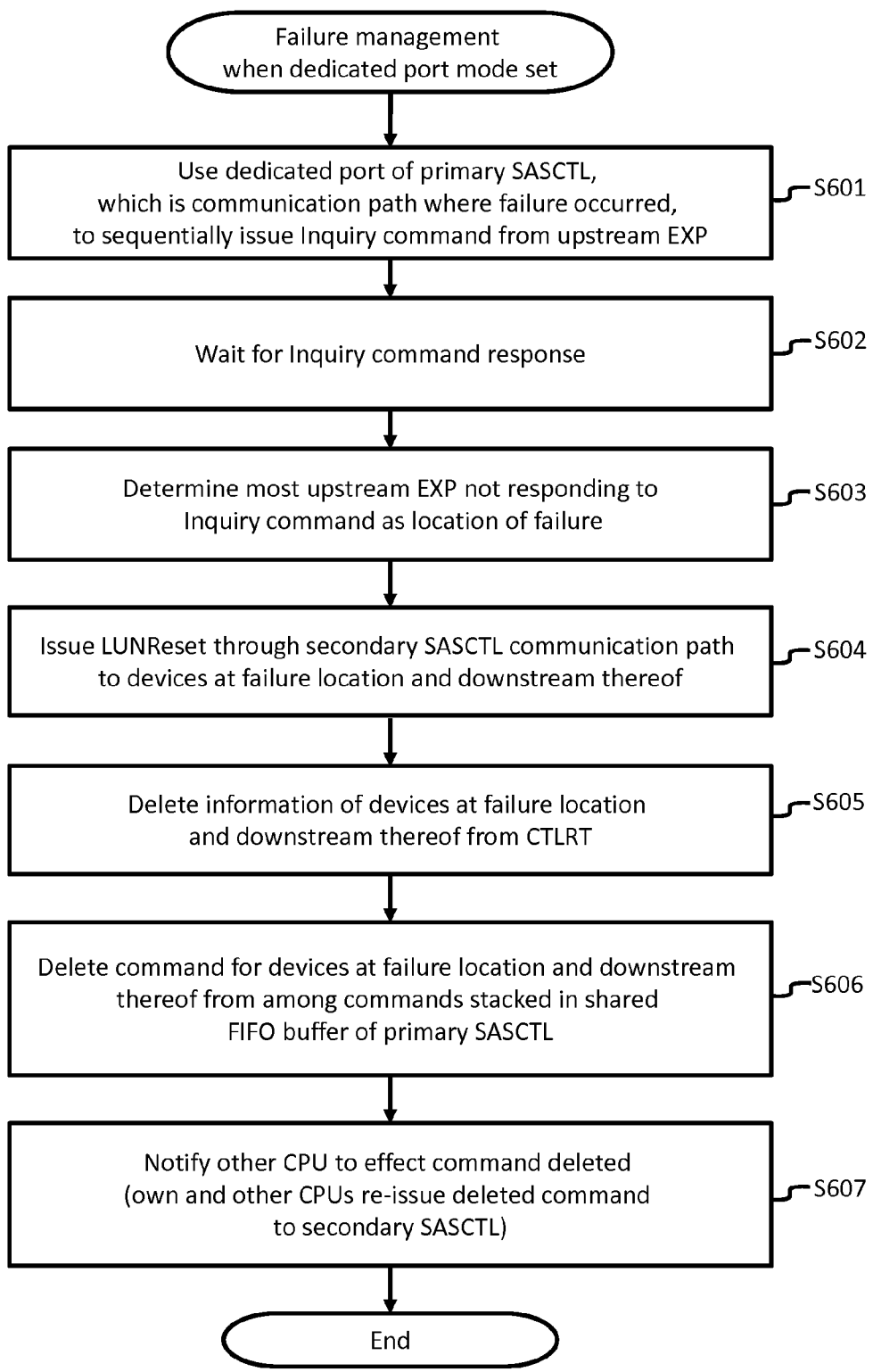
FIG. 20 is a flowchart of failure management in a case where the dedicated port mode has been configured.

FIG. 20 shows a flowchart of failure management in a case where the dedicated port mode has been configured.

The storage control apparatus 10, upon detecting the occurrence of a failure, starts failure management. The storage control apparatus 10, for example, detects the occurrence of a failure by the fact that a normal response has not been obtained with respect to an issued command. The storage control apparatus 10, for example, detects the occurrence of a failure by receiving a Broadcast (Change) Primitive command from the EXP 12. Failure management in a case where a failure has occurred on the primary communication path 100*a* of the primary SASCTL 20 will be explained below by referring to the relevant FIG. 20.

The storage control apparatus 10, upon detecting a failure, uses the dedicated port 39 #0' linked to the primary communication path 100*a* on which the failure occurred to issue an Inquiry command sequentially to the upstream EXPs 12 (in order from upstream to downstream) (S601). The issued Inquiry command is temporarily stacked in the FIFO buffer 59 of the dedicated port 39 #0', but since no other commands have been stacked previously, is outputted from the sPhy #0 right away.

The storage control apparatus 10 waits for a response from each EXP 12 (device) with respect to the issued Inquiry command (S602).

The storage control apparatus 10 identifies the most upstream EXP 12 of the EXPs 12 from which there was no response to the issued Inquiry command as the location of the failure (S603). The location of the failure may be the EXP 12 from which there was no response, or may be a communication route between the EXP 12 from which there was no response and an EXP 12 from which there was a response. That is, the storage control apparatus 10, in accordance with identifying the location of the failure, knows that as a result of the failure it is not possible to access the devices of the location where the failure has occurred and downstream thereof.

The storage control apparatus 10 issues a LUNReset command to each device located at the failure location and downstream thereof from the secondary SASCTL 20 via the secondary communication path 100*b*(S604). That is, the storage control apparatus 10, via the secondary communication path 100*b*, instructs the devices, which cannot be accessed from the primary communication path 100*a* as a result of the failure, to reset. The LUNReset command may also be outputted from the dedicated port 39 #0' of the secondary SASCTL 20.

The storage control apparatus 10 deletes the information concerning the devices at the failure location and downstream thereof from the primary CTLRT 52 (S605).

The storage control apparatus 10 deletes a command targeting the devices at the failure location and downstream thereof from the commands stacked in the shared FIFO buffer 50 of the primary SASCTL 20 (S606).

Since the storage control apparatus 10 comprises multiple CPUs 25 as shown in FIG. 1, in a case where one CPU 25 has executed the above-mentioned Steps S601 through S606, the other CPU 25 does not know that a command, which it issued itself, has been deleted as a result of the processing of Step S606. Therefore, the CPU 25, which executes Step S606, notifies the other CPU 25 to the effect that the command has been deleted from the shared FIFO buffer 50 (S607). The one CPU 25, which executed the Step S606, and the other CPU 25, which received this notification, re-issue the deleted command to the secondary SASCTL 20.

According to the above processing, the storage control apparatus 10 is able to identify the location where a failure occurred in a shorter period of time. In addition, the storage control apparatus 10 is able to switch the access route for the devices located at the failure location and downstream thereof to the secondary communication path 100*b* (that is, the redundant communication path) in a shorter period of time. It is also possible to reduce a drop in storage system 1 redundancy since a device upstream of the failure location can be accessed from both the primary communication path 100*a* and the secondary communication path 100*b*.

Figure 21:
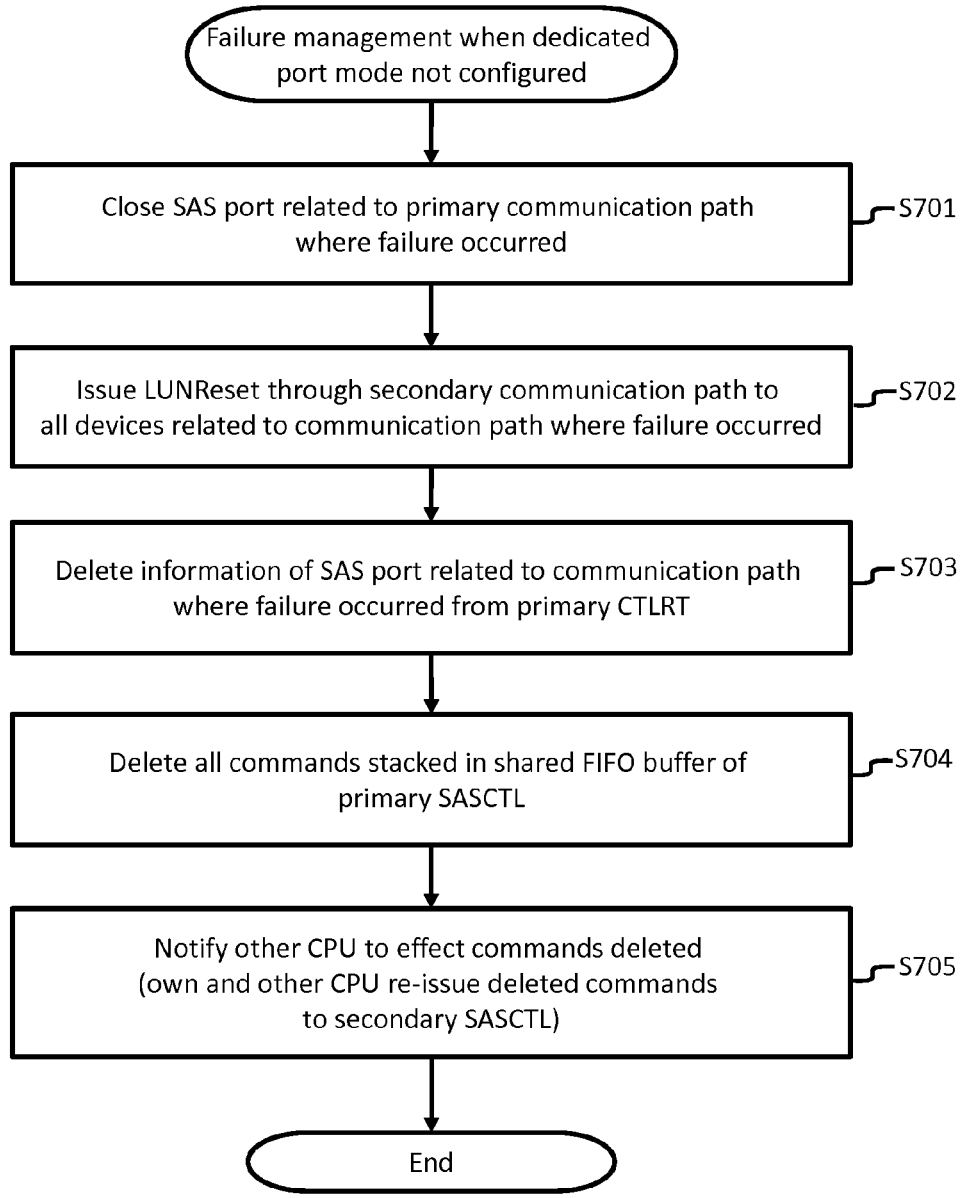
FIG. 21 is a flowchart showing failure management in a case where the dedicated port mode has not been configured.

FIG. 21 is a flowchart showing failure management in a case where the dedicated port mode is not configured. In accordance with the following processing, it is possible to switch the access route to the redundant path in a shorter period of time in a case where a failure has occurred even when the dedicated port mode is not configured.

The storage control apparatus 10, upon detecting the occurrence of a failure, starts failure management. An example of failure detection was explained using FIG. 20. Failure management in a case where a failure has occurred on the primary communication path 100*a* of the primary SASCTL 20 will be explained below by referring to the relevant FIG. 21.

The storage control apparatus 10, upon detecting a failure, closes the SAS port 31 #0 related to the primary communication path 100*a* on which the failure occurred (S701). That is, the storage control apparatus 10 closes the sPhys #0 through #3 being used by the SAS port 31 #0. Furthermore, the storage control apparatus 10 reflects the fact that the sPhys #0 through #3 have been closed in the port status 54.

The storage control apparatus 10, via the secondary communication path 100*b* from the secondary SASCTL 20, issues a LUNReset command to all the devices linked to the primary communication path 100*a* on which the failure occurred (S702). That is, the storage control apparatus 10 instructs all the devices unable to be accessed from the primary communication path 100*a* due to the failure to reset.

The storage control apparatus 10 deletes the information of the SAS port 31 related to the primary communication path 100*a* on which the failure occurred from the primary CTLRT 52 (S703).

The storage control apparatus 10 deletes all the commands stacked in the shared FIFO buffer 50 of the primary SASCTL 20 (S704).

In a case where the storage control apparatus 10 comprises multiple CPUs 25 as shown in FIG. 1, the one CPU 25, which executed the Step S703, notifies the other CPU 25 to the effect that the commands have been deleted from the shared FIFO buffer 50 (S705). The one CPU 25, which executed the Step S703, and the other CPU 25, which received the notification, re-issue the deleted commands to the secondary SASCTL 20.

According to the above processing, the storage control apparatus 10, upon detecting the occurrence of a failure, immediately closes the SAS port 31 related to the communication path on which the failure occurred rather than issuing a command for identifying the failure location. That is, since there is no need for the storage control apparatus 10 to wait for a response to a command for identifying the failure location, the storage control apparatus 10 can switch the access route to the secondary communication path 100b (that is, the redundant path) in a shorter period of time.

Second Embodiment

In a second embodiment, a storage system 1, which decides a SAS port 31 to be used by the SASCTL 20 based on a command type, will be explained.

FIG. 22 shows an example of a data configuration diagram of an output SAS port selection table 70 stored in the SASCTL 20.

The output SAS port selection table 70, for example, is stored in the memory 22 of the SASCTL 20. The output SAS port selection table 70 manages the corresponding relationship between a command type 301 and an output SAS port number 302.

The command type 301 shows the type of the command type 201 of the SAS command 64. The output SAS port selection table 70 categorizes a command, which is used at failure management in a case where the dedicated port mode has been configured, as a different command type from a command, which is used at normal times. That is, the output SAS port selection table 70 categorizes a command outputted from the dedicated port 39 during failure management as a different command type than the command outputted from a normal SAS port 31.

The output SAS port number 302 shows the number of the SAS port 31, which outputs a command belonging to the command type 301.

For example, the output SAS port selection table 70 shown in FIG. 22 categorizes the SAS command 64 into such command types 301 as a SSP (Serial SCSI Protocol), a SMP (SAS Management Protocol), a SES (SCSI Enclosure Service), and other. For example, a Read/Write command is categorized as command type 301 "SSP". A Discovery command, for example, is categorized as command type 301 "SMP". An Inquiry command, for example, is categorized as command type 301 "SES".

The record 70a of the output SAS port selection table 70 of FIG. 22 indicates that a command (for example, a Read command), which is categorized as command type 301 "SSP", is outputted from either the SAS port 31 #0 or #1. The record 70c indicates that a command (for example, an Inquiry command), which is categorized as command type 301 "SES", is outputted from either the dedicated port 39 #0' or #1'.

For example, the SASCTL 20 references the output SAS port selection table 70 and outputs a Read command from either SAS port 31 #0 or #1. The SASCTL 20 references the output SAS port selection table 70 and outputs an Inquiry command from either dedicated port 39 #0' or #1'.

The SASCTL 20 may use the output SAS port selection table 70 only when managing a failure, or may use this table 70 at both normal times and when managing a failure.

According to this embodiment, the CPU 25 of the storage control apparatus 10 does not have to determine whether or not to use the dedicated port 39. That is, the CPU 25 of the storage control apparatus 10 related to the first embodiment clearly specified the used SAS port 203 in the SAS command 64 as shown in FIG. 13, but this is not necessary in the second embodiment. That is, the CPU 25 of the storage control apparatus 10 related to the second embodiment may use the SAS command 60 shown in FIG. 4.

Third Embodiment

Figure 23:
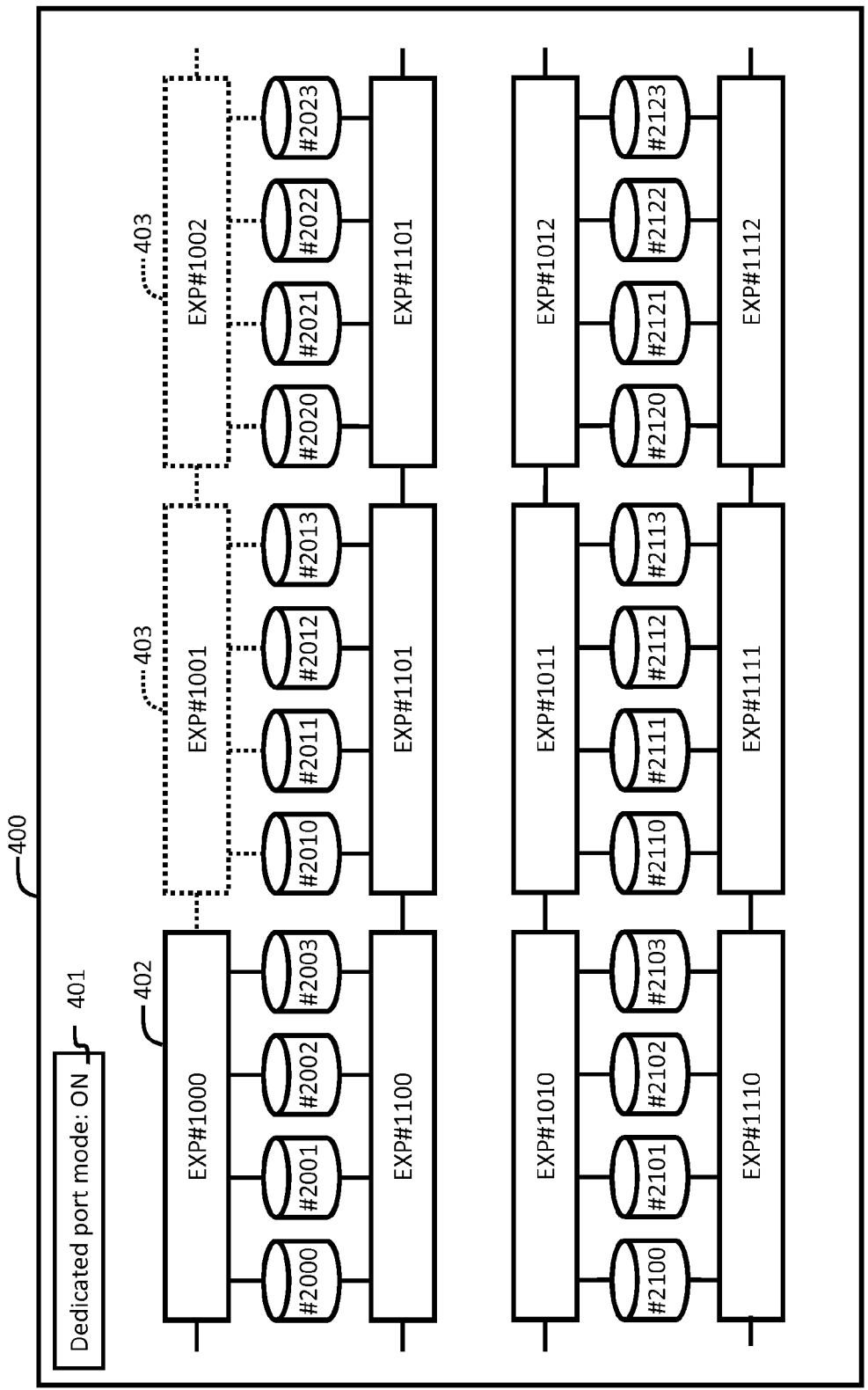
FIG. 23 is an image of a case in which a location where a failure occurred has been identified as EXP 12 #1001 when the dedicated port mode is configured.
Figure 24:
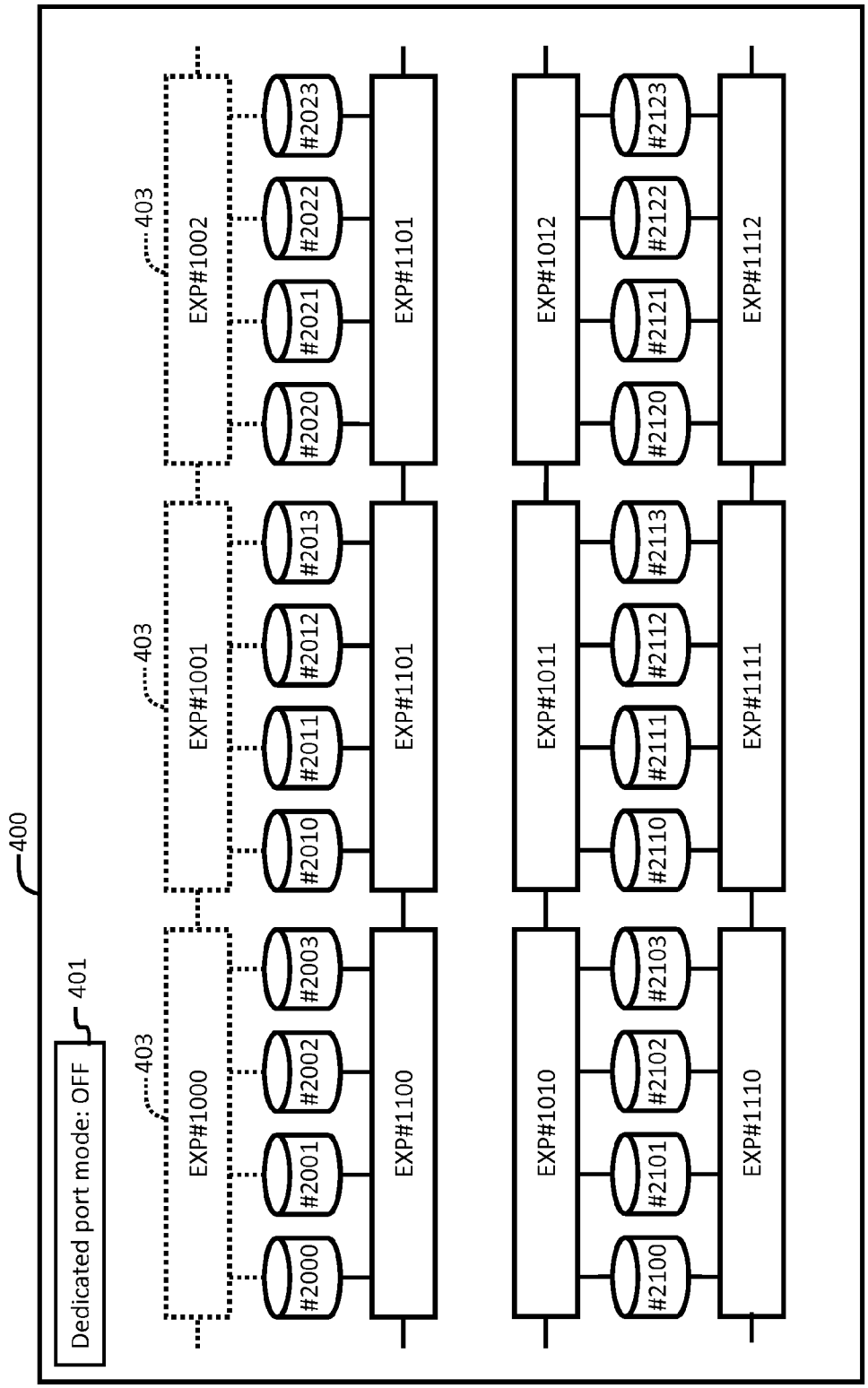
FIG. 24 is an image of a case in which a failure has occurred in the EXP 12 #1001 when the dedicated port mode is not configured.

In a third embodiment, a storage system 1, which visually displays the location where a failure has occurred, will be explained. FIGS. 23 and 24 are image diagrams of images showing the locations of failures. An image 400 like those shown in FIGS. 23 and 24 is displayed on a display device or the like (not shown in the drawing) coupled to the storage control apparatus 10. The image 400, for example, shows each device and the coupling configuration of the devices comprising the storage system 1. The image 400 displays setting information 401 showing whether or not the dedicated port mode has been configured. The image 400 displays a device 403, which is inaccessible due to a failure, so as to be able to distinguish this device 403 from a normal device 402. For example, the image 400 displays the failure-inaccessible device 403 as blinking. For example, the image 400 displays the failure-inaccessible device 403 using a different color from that of a normal device 402.

FIG. 23 shows an image in a case where the dedicated port mode is configured and EXP 12 #1001 has been identified as the location where a failure has occurred. Upon detecting the occurrence of a failure when the dedicated port mode is configured, the storage control apparatus 10 is unable to access the EXP 12 located at the failure location and downstream thereof as was explained above using FIG. 20. Therefore, the storage control apparatus 10 displays the EXP 12 #1001 and the EXP 12 #1002, which is located downstream thereof, as blinking.

FIG. 24 shows an image in a case where the dedicated port mode is not configured and a failure has occurred at EXP 12 #1001. Upon detecting the occurrence of a failure when the dedicated port mode is not configured, the storage control apparatus 10 is unable to access any of the EXPs 12 on the communication path where the failure occurred as was explained above using FIG. 21. Therefore, the storage control apparatus 10 displays the EXP 12 #1000 as well as EXP 12 #1001 and EXP 12 #1002, which are located downstream thereof, as blinking.

The storage control apparatus 10, in a case where the location of the failure is a storage device 13, may display the storage device 13 in which this failure occurred as blinking. In a case where failures have occurred in both the primary EXP 12 and the secondary EXP 12 coupled to the same storage device 13, the storage control apparatus 10 may display this primary EXP 12 and this secondary EXP 12, and the storage devices 13 coupled to this primary EXP 12 and this secondary EXP 12 as blinking.

According to this embodiment, it is possible to convey the location of a failure to the user visually for ease of understanding. In addition, according to this embodiment, in a case where the dedicated port mode is configured, it is possible to visually convey to the user the EXP 12 up to which redundancy is ensured for ease of understanding.

All of the present invention-related embodiments explained hereinabove are examples for explaining the present invention, and do not purport to limit the scope of the present invention solely to these embodiments. A person having ordinary skill in the art will be able to put the present invention into practice using various other modes without departing from the gist of the present invention. For example, the present invention can be expressed as follows based on the above explanations.

(Wording 1)

A storage system, comprising a storage device for storing data, a control apparatus which controls the storage device and comprises multiple communication ports, and a switch apparatus which expands the number of the storage device couplings and comprises multiple communication ports, the respective multiple communication ports of the control apparatus being coupled to the respective multiple communication ports of the switch apparatus, and the switch apparatus being coupled to the storage device, wherein the control apparatus configures at least one communication port of the multiple communication ports of the control apparatus, to a dedicated communication port for outputting only a prescribed command in a case where a failure has been detected.

(Wording 2)

A storage system according to wording 1, wherein in a case where a failure has been detected, the control apparatus outputs, from the dedicated communication port, the prescribed command for identifying a location where the failure has occurred in the storage system.

(Wording 3)

A storage system according to wording 2, wherein the control apparatus comprises a controller for controlling this control apparatus, a communication interface device which comprises the multiple communication ports, and a data bus for connecting the controller to the communication interface, and the communication interface device comprises a dedicated FIFO (First In First Out) buffer for stacking a command to be outputted from the dedicated communication port, and a shared FIFO buffer for stacking a command to be outputted from a communication port other than the dedicated communication port.

(Wording 4)

A storage system according to wording 3, wherein there are multiple communication paths comprising the multiple switch apparatuses, which are coupled in series with the control apparatus as a starting point, and the control apparatus is able to access each of the storage devices via any communication path of the multiple communication paths, and upon detecting a failure, the controller outputs a prescribed command for identifying a location of the failure from the dedicated communication port which forms the communication path on which the relevant failure has been detected, to identify the switch apparatus in which the failure has occurred, makes it possible to access the identified switch apparatus and the storage device coupled at a stage subsequent to the relevant switch apparatus only from a communication path other than the communication path on which the failure has been detected, and also makes it possible to access the storage device coupled at a stage prior to the relevant switch apparatus also from the communication path on which the failure has been detected.

(Wording 5)

A storage system according to either wording 3 or 4, wherein the controller configures the dedicated communication port in a case where a transmission bandwidth based on the multiple communication ports is larger than a transmission bandwidth based on the data bus.

(Wording 6)

A storage system according to any of wordings 3 through 5, wherein the switch apparatus and the storage device operate on the basis of a SAS (Serial Attached SCSI) protocol, a SAS address is assigned to each of the control apparatus, the switch apparatus, and the storage device, a source SAS address and a destination SAS address are set in the command, a dedicated SAS address, which differs from the SAS address of the control apparatus, is assigned to the dedicated communication port, and the dedicated SAS address is set in a source of a command to be outputted from the dedicated communication port.

(Wording 7)

A storage system according to wording 6, wherein an Inquiry command related to the SAS protocol is used as the prescribed command for identifying the failure location.

(Wording 8)

A storage system according to wording 7, wherein upon detecting a failure, the controller sequentially sends the Inquiry commands from the dedicated communication port forming the communication path on which the failure has been detected to each of multiple switch apparatuses with the switch apparatus, which is directly coupled to the control apparatus, as a starting point, and identifies a switch apparatus, which does not respond to the relevant Inquiry command, as the switch apparatus in which the failure has occurred.

(Wording 9)

A storage system according to wording 5, wherein upon detecting a failure when the dedicated communication port is not configured, the controller closes all communication ports forming the communication path on which the failure has been detected, and makes it possible to access the storage device only from a communication path other than the communication path on which the failure has been detected.

(Wording 10)

A storage system according to wording 9, wherein the control apparatus comprises a display part for graphically displaying a configuration of the relevant storage system, wherein when a failure is detected, the display part:

in a case where the dedicated communication port is configured, displays an expander device which has been identified as the failure location, and an expander device at a stage subsequent to the relevant expander device, using a mode which distinguishes these expander devices from other accessible expander devices; and in a case where the dedicated communication port is not configured, displays all expander devices forming the communication path on which the failure has been detected, using a mode which distinguishes these expander devices from other accessible expander devices.

(Wording 11)

A storage control apparatus, which controls a storage device for storing data, comprising:

a controller for controlling the storage control apparatus;

a communication interface device comprising multiple communication ports; and a data bus for connecting the controller to the communication interface device, wherein respective multiple communication ports of the communication interface device are coupled to respective communication ports of a switch apparatus, which expands the number of the storage device couplings and comprises multiple communication ports, and the controller configures at least one communication port of the multiple communication ports of the communication interface device, to a dedicated communication port for outputting only a prescribed command issued when a failure is detected.

(Wording 12)

A storage control method in a storage system, which comprises a control apparatus which controls a storage device for storing data and comprises multiple communication ports, and a switch apparatus which expands the number of the storage device couplings and comprises multiple communication ports, respective multiple communication ports of the control apparatus being coupled to respective multiple communication ports of the switch apparatus, and the switch apparatus being coupled to the storage device, the storage control method comprising the steps of:

configuring at least one communication port of the multiple communication ports of the control apparatus, to a dedicated communication port for outputting only a prescribed command issued when a failure is detected; and outputting the prescribed command for identifying a location where the failure has occurred in the storage system from the dedicated communication port, in a case where a failure has been detected.

REFERENCE SIGNS LIST

1 Storage system
10 Storage control apparatus
11 Host
12 SAS EXPANDER
13 Storage device
20 SAS CONTROLLER

The invention claimed is:

1. A storage system comprising:
a storage device for storing data;
a CPU for processing an instruction from a host computer;
a control apparatus which controls communication between the CPU and the storage device, and comprises multiple communication ports including a first communication port and a second communication port; and
a switch apparatus which expands the number of the storage device couplings and comprises multiple communication ports, respective multiple communication ports of the control apparatus being coupled to respective multiple communication ports of the switch apparatus, and the switch apparatus being coupled to the storage device;
wherein the first communication port is used to output only a prescribed command for failure recovery issued when a failure is detected and is not used when the storage system is operating normally; and
wherein the second communication port is used to read data from the storage device when the storage system is operating normally.

2. A storage system according to claim 1, wherein when a failure has been detected, the control apparatus outputs, from the dedicated communication port, the prescribed command for identifying a location where the failure has occurred in the storage system.

3. A storage system according to claim 2, wherein the control apparatus comprises a controller for controlling this control apparatus, a communication interface device which comprises the multiple communication ports, and a data bus for connecting the controller to the communication interface device, and
the communication interface device comprises a dedicated FIFO (First In First Out) buffer for stacking a command to be outputted from the dedicated communication port, and a shared FIFO buffer for stacking a command to be outputted from a communication port other than the dedicated communication port.

4. A storage system according to claim 3, wherein there are multiple communication paths comprising the multiple switch apparatuses, which are coupled in series with the control apparatus as a starting point, and the control apparatus is able to access each of the storage devices via any communication path of the multiple communication paths, and
upon detecting a failure, the controller outputs a prescribed command for identifying a location of the failure from the dedicated communication port which forms the communication path on which the relevant failure has been detected, to identify the switch apparatus in which the failure has occurred, makes it possible to access the identified switch apparatus and the storage device coupled at a stage subsequent to the relevant switch apparatus only from a communication path other than the communication path on which the failure has been detected, and also makes it possible to access the storage device coupled at a stage prior to the relevant switch apparatus also from the communication path on which the failure has been detected.

5. A storage system according to claim 3, wherein the controller configures the dedicated communication port in a case where a transmission bandwidth based on the multiple communication ports is larger than a transmission bandwidth based on the data bus.

6. A storage system according to claim 5, wherein upon detecting a failure when the dedicated communication port is not configured, the controller closes all communication ports forming the communication path on which the failure has been detected, and makes it possible to access the storage device only from a communication path other than the communication path on which the failure has been detected.

7. A storage system according to claim 6, wherein the control apparatus comprises a display part for graphically displaying a configuration of the relevant storage system,
wherein when a failure is detected, the display part:
in a case where the dedicated communication port is configured, displays an expander device which has been identified as the failure location, and an expander device at a stage subsequent to the relevant expander device, using a mode which distinguishes these expander devices from other accessible expander devices; and
in a case where the dedicated communication port is not configured, displays all expander devices forming the communication path on which the failure has been detected, using a mode which distinguishes these expander devices from other accessible expander devices.

8. A storage system according to claim 3, wherein the switch apparatus and the storage device operate on the basis of a SAS (Serial Attached SCSI) protocol, a SAS address is assigned to each of the control apparatus, the switch apparatus, and the storage device, a source SAS address and a destination SAS address are set in the command, a dedicated SAS address, which differs from the SAS address of the control apparatus, is assigned to the dedicated communication port, and the dedicated SAS address is set in a source of a command to be outputted from the dedicated communication port.

9. A storage system according to claim 8, wherein an Inquiry command related to the SAS protocol is used as a prescribed command for identifying the failure location.

10. A storage system according to claim 9, wherein upon detecting a failure, the controller sequentially sends the Inquiry commands from the dedicated communication port forming the communication path on which the failure has been detected to each of multiple switch apparatuses with the switch apparatus, which is directly coupled to the control apparatus, as a starting point, and identifies a switch apparatus, which does not respond to the relevant Inquiry command, as the switch apparatus in which the failure has occurred.

11. A storage control apparatus, which controls a storage device for storing data, comprising:
a controller for controlling the storage control apparatus;
a communication interface device comprising multiple communication ports including a first communication port and a second communication port; and
a data bus for connecting the controller to the communication interface device,
wherein respective multiple communication ports of the communication interface device are coupled to respective communication ports of a switch apparatus, which expands the number of the storage device couplings and comprises multiple communication ports, and the first communication port is used to output only a prescribed command for failure recovery issued when a failure is detected and is not used when the storage system is operating normally, and wherein the second communication port is used to read data from the storage device when the storage system is operating normally.

12. A storage control method in a storage system, which comprises a CPU for processing an instruction from a host computer, a control apparatus which controls communication between the CPU and a storage device for storing data and comprises multiple communication ports including a first communication port and a second communication port, and a switch apparatus which expands the number of the storage device couplings and comprises multiple communication ports, respective multiple communication ports of the control apparatus being coupled to respective multiple communication ports of the switch apparatus, and the switch apparatus being coupled to the storage device, the storage control method comprising the steps of:

using the first communication port to output only a prescribed command for failure recovery issued when a failure is detected and not using the first communication port when the storage system is operating normally;

using the second communication port to read data from the storage device when the storage system is operating normally; and outputting the prescribed command for identifying a location where the failure has occurred in the storage system from the dedicated communication port in a case where a failure has been detected.

* * * * *